United States Patent
Yano et al.

(10) Patent No.: US 8,709,586 B2
(45) Date of Patent: Apr. 29, 2014

(54) MODIFIED POLYOLEFIN RESIN FOR GLASS FIBER TREATMENT, SURFACE-TREATED GLASS FIBER, AND FIBER-REINFORCED POLYOLEFIN RESIN

(75) Inventors: Koki Yano, Sodegaura (JP); Rikuo Onishi, Ichihara (JP)

(73) Assignee: Prime Polymer Co., Ltd., Tokyo (JP)

( * ) Notice: Subject to any disclaimer, the term of this patent is extended or adjusted under 35 U.S.C. 154(b) by 1083 days.

(21) Appl. No.: 11/577,760

(22) PCT Filed: Oct. 20, 2005

(86) PCT No.: PCT/JP2005/019285
§ 371 (c)(1), (2), (4) Date: Apr. 23, 2007

(87) PCT Pub. No.: WO2006/043620
PCT Pub. Date: Apr. 27, 2006

(65) Prior Publication Data
US 2009/0075078 A1 Mar. 19, 2009

(30) Foreign Application Priority Data
Oct. 22, 2004 (JP) ................. 2004-308485

(51) Int. Cl.
*B32B 27/12* (2006.01)
(52) U.S. Cl.
USPC ..... 428/298.7; 428/375; 428/392; 428/299.4; 428/297.4
(58) Field of Classification Search
USPC ......................... 428/375, 391, 392
See application file for complete search history.

(56) References Cited

U.S. PATENT DOCUMENTS

| | | | | | |
|---|---|---|---|---|---|
| 2,939,859 | A | * | 6/1960 | Bruin et al. | 525/529 |
| 2,958,686 | A | * | 11/1960 | Dunbam et al. | 528/481 |
| 4,506,056 | A | * | 3/1985 | Gaylord | 524/445 |
| 4,698,395 | A | * | 10/1987 | Inoue et al. | 525/327.8 |
| 5,079,295 | A | * | 1/1992 | Furuta et al. | 525/68 |
| 5,095,063 | A | * | 3/1992 | Okada et al. | 524/413 |
| 5,367,022 | A | * | 11/1994 | Kiang et al. | 525/74 |
| 5,369,173 | A | * | 11/1994 | Furuta | 525/68 |
| 5,514,745 | A | * | 5/1996 | Yoshino | 524/494 |
| 6,262,182 | B1 | * | 7/2001 | Eagan et al. | 525/285 |
| 7,060,787 | B2 | * | 6/2006 | Gupta et al. | 528/480 |
| 7,550,065 | B2 | * | 6/2009 | Keyvani et al. | 203/52 |

FOREIGN PATENT DOCUMENTS

| | | | | |
|---|---|---|---|---|
| JP | 2 173008 | | 7/1990 | |
| JP | 02185505 | A * | 7/1990 | ............... C08F 8/46 |
| JP | 3 181528 | | 8/1991 | |

(Continued)

OTHER PUBLICATIONS

JP2005-170691, machine translation, Jun. 2005.*

(Continued)

*Primary Examiner* — Jill Gray
(74) *Attorney, Agent, or Firm* — Oblon, Spivak, McClelland, Mair & Neustadt, L.L.P.

(57) ABSTRACT

An acid-modified polyolefin-based resin for glass fiber treatment having: (1) an amount of components extractable with boiling methyl ethyl ketone of 8 mass % or less; (2) a number average molecular weight (Mn), measured by gel permeation chromatography (GPC), of 6,000 to 48,000; and (3) an amount of an acid which has been added, measured by Fourier transform infrared spectroscopy, of 0.1 to 12 mass %.

12 Claims, 1 Drawing Sheet

(56) References Cited

FOREIGN PATENT DOCUMENTS

| JP | 04202202 A | * | 7/1992 | ............... C08F 6/00 |
|----|-----------|---|--------|---------------------------|
| JP | 6 316445 | | 11/1994 | |
| JP | 7 309979 | | 11/1995 | |
| JP | 2002 212435 | | 7/2002 | |
| JP | 2003 253563 | | 9/2003 | |
| JP | 2003 321555 | | 11/2003 | |
| JP | 2004 2837 | | 1/2004 | |
| JP | 2005 170691 | | 6/2005 | |
| JP | 2005-256206 A1 | * | 9/2005 | |
| JP | 2005 290110 | | 10/2005 | |
| WO | 03 035706 | | 5/2003 | |

OTHER PUBLICATIONS

JP2005-256206A, machine translation, Sep. 2005.*

U.S. Appl. No. 11/597,174, filed Nov. 21, 2006, Yano, et al.

* cited by examiner

NOTCH RADIUS R    R ≑ 50mm

MODIFIED POLYOLEFIN RESIN FOR GLASS FIBER TREATMENT, SURFACE-TREATED GLASS FIBER, AND FIBER-REINFORCED POLYOLEFIN RESIN

TECHNICAL FIELD

The invention relates to a modified polyolefin-based resin for glass fiber treatment, a surface-treated glass fiber, and a fiber-reinforced polyolefin-based resin. In particular, the invention relates to a modified polyolefin-based resin for glass fiber treatment (also referred to as coating agent, film forming agent, sizing agent, or the like) capable of forming a molded article which exhibits significantly improved fatigue strength under oscillation, a surface-treated glass fiber, and a fiber-reinforced polyolefin-based resin.

BACKGROUND ART

It has been known that glass fiber-reinforced polypropylene (GFPP) can exhibit improved strength by using aminosilane-treated glass fibers and adding carboxylic acid group-containing polypropylene. It is also known that an acid-modified polyolefin is used for glass fiber treatment. However, studies on the acid-modified polyolefin used have mainly focused on impregnation properties and bundling properties, and the properties of the modified polyolefin-based resin for glass fiber treatment for improving the properties (particularly fatigue strength under oscillation) of GFPP have not been extensively studied (see Patent Documents 1 and 2, for example).

Glass fiber treatment and the composition of a resin composition containing treated glass fibers (glass fiber-reinforced polypropylene) have been studied separately, and only a limited number of studies have been made on the combination of the glass fiber treatment and the composition of the resin composition. Accordingly, outstanding performance has not yet been developed (see Patent Document 3, for example).

Although studies have been made on improvement of fatigue strength under oscillation (see Patent Documents 4 and 5, for example), these studies have mainly focused on the molecular weight of the polypropylene resin part or the like. Specifically, the interface between glass and a resin (particularly polyolefin used for a sizing agent) has not yet been studied.

[Patent Document 1] JP-A-3-181528
[Patent Document 2] JP-A-2003-253563
[Patent Document 3] JP-A-7-309979
[Patent Document 4] JP-A-2004-2837
[Patent Document 5] JP-A-2003-321555

The invention has been achieved in view of the above-mentioned problems. An object of the invention is to provide a modified polypropylene-based resin for glass fiber treatment capable of forming a molded article which exhibits significantly improved fatigue strength under oscillation, a surface-treated glass fiber, and a fiber-reinforced polypropylene-based resin.

DISCLOSURE OF THE INVENTION

In order to achieve the above object, the inventors have conducted extensive studies on the glass fiber treatment and the composition of an acid-modified polyolefin. As a result, the inventors have found that fatigue strength under oscillation can be significantly improved by reducing the amount of low-molecular-weight polar components (components soluble in boiling methyl ethyl ketone) of acid-modified polyolefin (maleic acid-modified polypropylene) used for a sizing agent. The invention has been made based on this finding.

Specifically, if low-molecular-weight polar components (components soluble in boiling methyl ethyl ketone) which may be bonded to a silane coupling agent are present in a sizing agent, a functional group (generally amino group) on the surface of the glass fiber is bonded to the low-molecular-weight polar component during glass fiber surface treatment, whereby the number of functional groups to which the acid-modified polypropylene in the resin can be bonded is reduced. The low-molecular-weight polar components (components soluble in boiling methyl ethyl ketone) have a small mass ratio due to a low molecular weight, but are bonded to a large number of functional groups on the glass surface due to a large number of molecules, thereby considerably affecting fatigue strength under oscillation.

In general, the glass fiber surface treatment is conducted before producing the composition. Therefore, if low-molecular-weight polar components which may be bonded to a silane coupling agent (components soluble in boiling methyl ethyl ketone) are present in a sizing agent, the low-molecular-weight polar components are bonded to the silane coupling agent before the acid-modified polypropylene. Accordingly, when the low-molecular-weight polar components (components soluble in boiling methyl ethyl ketone) are contained in the sizing agent used for the glass fiber surface treatment, adverse effects are increased in comparison with the case where the low-molecular-weight polar components are contained in the glass fiber-reinforced resin.

Moreover, since the static strength (tensile strength) varies to a greater extent than the fatigue strength under oscillation, the resin is likely to be damaged, and little difference in interfacial strength is developed.

The components and the production mechanism of the low-molecular-weight polar components (components soluble in boiling methyl ethyl ketone) have not yet been fully elucidated. As the components of the low-molecular-weight polar components, an organic peroxide residue and its reaction product, a reaction by-product of such as an acid-modified polyolefin with a very low molecular weight (oligomer), unreacted raw materials such as an acid (e.g. carboxylic acid represented by maleic acid and maleic anhydride) or an organic peroxide, and additives such as an antioxidant and a fatty-acid metal salt may be considered.

Accordingly, the invention provides:
[1] An acid-modified polyolefin-based resin for glass fiber treatment comprising:
(1) an amount of components extractable with boiling methyl ethyl ketone is 8 mass % or less;
(2) an number average molecular weight (Mn), measured by gel permeation chromatography (GPC), is 6,000 to 48,000; and
(3) an amount of acid which has been added, measured by Fourier transform infrared spectroscopy, is 0.1 to 12 mass %;
[2] The acid-modified polyolefin-based resin for glass fiber treatment of [1] which is a maleic acid-modified polypropylene-based resin;
[3] A surface-treated glass fiber processed by a sizing agent containing the modified polyolefin-based resin for glass fiber treatment of [1] or [2] wherein the fiber diameter of the glass fiber is 3 to 30 μm;
[4] A fiber-reinforced polyolefin-based resin comprising the surface-treated glass fiber of [3] wherein the aspect ratio of the glass fiber (average fiber length/average fiber diameter) is 50 to 6000;
[5] The fiber-reinforced polyolefin-based resin of [5] which is a polypropylene resin;

[6] A long fiber-reinforced polyolefin-based resin pellet obtainable by using the surface-treated glass fiber of [3] wherein the pellet length is 2 to 200 mm;

[7] The long fiber-reinforced polyolefin-based resin pellet of [6] comprising 0.2 to 50 mass % of an acid-modified polyolefin resin in a resin component;

[8] The long fiber-reinforced polyolefin-based resin pellet of [6] or [7] comprising a polypropylene-based resin;

[9] A dry blending mixture obtainable by dry blending the long fiber-reinforced polyolefin-based resin pellet of any one of [6] to [8] and a thermoplastic resin;

[10] The dry blending mixture of [9] wherein the thermoplastic resin is a polyolefin-based resin;

[11] The dry blending mixture of [9] or [10] wherein the thermoplastic resin is a polyolefin-based resin containing a maleic acid-modified polypropylene-based resin;

[12] A method for producing an acid-modified polypropylene-based resin comprising:

subjecting 100 parts by mass of a polypropylene-based resin, 0.01 to 20 parts by mass of an organic peroxide having a one-minute half-life ($t_{1/2}$) of 80 to 260° C. and 0.1 to 30 parts by mass of an unsaturated carboxylic acid to melting reaction at a cylinder temperature of 100 to 230° C.; and removing (reducing) low-molecular-weight polar components by one or more processes selected from degassing, washing and purification;

[13] A method for producing a long fiber-reinforced polyolefin-based resin pellet comprising:

subjecting fiber bundles to a sizing process with a sizing agent containing the acid-modified polyolefin-based resin for glass fiber treatment of [1] or [2]; and impregnating the sizing-processed fiber bundles with an olefin-based resin component while withdrawing the continuous fiber bundles so that the composition contains 5 to 80 mass % of glass fibers;

[14] A molded article obtainable by molding the fiber-reinforced polyolefin-based resin, the long fiber-reinforced resin pellet or a dry blending mixture of any one of [4] to [11]; and

[15] The molded article of [14] having an average residual fiber length of 0.4 mm or more.

According to the invention, the amount of low-molecular-weight polar components (soluble in boiling methyl ethyl ketone) of the acid-modified polyolefin used for a sizing agent is reduced, whereby the fatigue strength under oscillation of a molded article formed of a fiber-reinforced polyolefin-based resin using glass fibers treated with the sizing agent is significantly improved. Therefore, various molded articles such as automobile parts produced using the fiber-reinforced polyolefin-based resin of the invention can maintain a high degree of reliability for a long period of time.

BEST MODE FOR CARRYING OUT THE INVENTION

Figure 1:
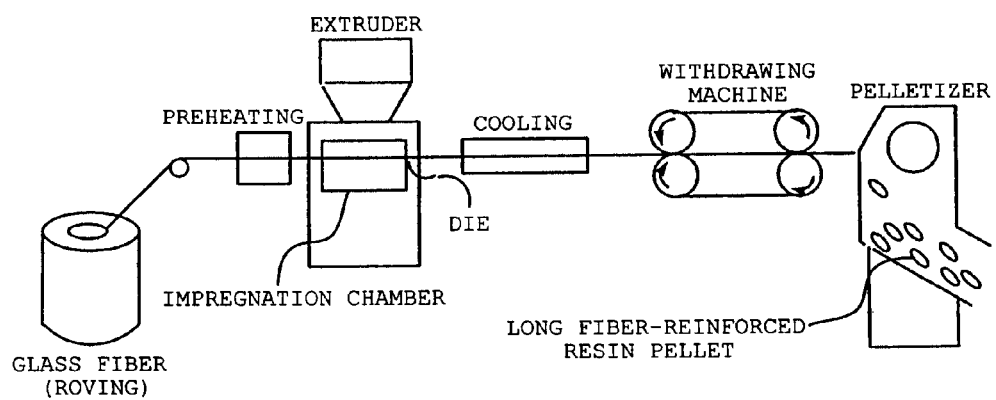
FIG. 1 is a schematic view of an apparatus for producing long fiber-reinforced polyolefin-based resin pellets used in Production Example 3.

The invention is described below in detail.

I. Acid-Modified Polyolefin-Based Resin for Glass Fiber Treatment

The modified polyolefin-based resin for glass fiber treatment of the invention (hereinafter referred to as "treatment resin of the invention") satisfies the following requirements (1) to (3).

(1) The amount of components extractable with boiling methyl ethyl ketone (MEK) is 8 mass % or less.

(2) The number average molecular weight (Mn), measured by gel permeation chromatography (GPC), is 6,000 to 48,000.

(3) The amount of an acid which has been added, measured by Fourier transform infrared spectroscopy, is 0.1 to 12 mass %.

A polyolefin-based resin (fiber-reinforced polyolefin-based resin) containing glass fibers treated with an acid-modified polyolefin-based resin satisfying the above requirements (1) to (3) enables production of a molded article which exhibits significantly improved fatigue strength under oscillation.

(I-1) Polyolefin-Based Resin

As an unmodified polyolefin-based resin used for the treatment resin of the invention, a polypropylene-based resin, in particular, a propylene homopolymer or an ethylene-propylene random copolymer is preferable, with the propylene homopolymer being still more preferable.

The limiting viscosity ($\eta$) of the polyolefin-based resin measured at 135° C. in decalin is normally 0.5 to 40, preferably 1 to 30, more preferably 2 to 20, still more preferably 3 to 15, and particularly preferably 4 to 10. If the limiting viscosity is less than 0.5, the molecular weight of the polyolefin-based resin may be significantly reduced during modification. On the other hand, it is difficult to produce a polyolefin-based resin having a molecular weight exceeding 40 on an industrial basis. The molecular weight distribution (Mw/Mn) of the polyolefin-based resin measured by GPC is normally 2 to 10, preferably 2.1 to 6, more preferably 2.2 to 5, still more preferably 2.3 to 4, and particularly preferably 2.4 to 3. It is difficult to produce a polypropylene-based resin with a molecular distribution of less than 2. If the molecular distribution exceeds 10, low-molecular-weight polar components are produced after modification, whereby fatigue strength under oscillation may be decreased.

The stereoregularity (mmmm fraction) of the polyolefin-based resin before modification is normally 90% or more, preferably 93% or more, more preferably 96% or more, and still more preferably 98% or more. If the stereoregularity of the polyolefin-based resin is less than 90%, fatigue strength under oscillation may be insufficient.

There are no restrictions as to the form of the polyolefin-based resin before modification. It is preferable that the polyolefin-based resin be partially or totally in a powder or granular form, since the amount of low-molecular-weight polar components is reduced due to an increase in reaction efficiency.

As the polypropylene used in the invention, commercially available polypropylene may be used. Commercially available polypropylene of which the fluidity is adjusted with an organic peroxide or a mixture of two or more types of commercially available polypropylene may also be used. The above polypropylene may be used as a component of a resin composition described later or as a dilution blending resin.

Examples of the commercially available polypropylene are given below. However, the polypropylene used in the invention is not limited thereto.

(1) Manufactured by Idemitsu Kosan Co., Ltd.
Propylene homopolymer: J-2003GP (MFR=21), J-2000GP (MFR=21), J-903GP (MFR=13), J-900GP (MFR=13), J-700GP (MFR=8), J-3003GV (MFR=30), J-3000GV (MFR=30), J-3000GP (MFR=30), H-50000 (MFR=500), H-100M (MFR=0.5), H-700 (MFR=7), Y-2000GP (MFR=20), Y-6005GM (MFR=60), E-105GM (MFR=0.5), F-300SV (MFR=3), Y-400GP (MFR=4), E-100GV (MFR=0.5)
Propylene-ethylene block copolymer: J-6083HP (MFR=60), J-5066HP (MFR=50), J-5085H (MFR=50), J-5051HP (MFR=50), J-3054HP (MFR=40), J-3056HP (MFR=40), J-950HP (MFR=32), J-762HP (MFR=13), J-466HP (MFR=3), JR3070HP (MFR=30), J-786HV (MFR=13), J-785H (MFR=13), J-784HV (MFR=13)
Propylene-ethylene random copolymer: J-3021GA (MFR=30), J-3021GR (MFR=30), J-2021GR (MFR=20)
(2) Manufactured by Sun Allomer Ltd.
Propylene homopolymer: PM900M (MFR=30), PM900A (MFR=30), PM802A (MFR=20), PM801Z (MFR=13), PM600Z (MFR=7.5), PM600M (MFR=7.5), PM600H (MFR=7.5), PM600A (MFR=7.5), PF-611 (MFR=30), PF-814 (MFR=3)
Propylene-ethylene block copolymer: PMB70X (MFR=63), PMB65X (MFR=63), PMB60W (MFR=63), PMB60A (MFR=63), PMA60Z (MFR=45), PMA80X (MFR=43), PMA60A (MFR=43), PM965C (MFR=35), PM953M (MFR=30), PM761A (MFR=9.5)
Propylene-ethylene random copolymer: PVC20M (MFR=85), PMC20M (MFR=85), PMA20V (MFR=45), PV940M (MFR=30), PM822V (MFR=20), PM811M (MFR=13), PM731V (MFR=9.5)
(3) Manufactured by Japan Polypropylene (Novatec PP)
Propylene homopolymer: MA3 (MFR=11), MA3AH (MFR=12), MA03 (MFR=25), SA05 (MFR=50)
Propylene-ethylene block copolymer: BC06C (MFR=60), BC05B (MFR=50), BC03GS (MFR=30), BC03B (MFR=30), BC03C (MFR=30), BC2E (MFR=16), BC3L (MFR=10), BC3H (MFR=8.5), BC3F (MFR=8.5), BC4ASW (MFR=5), BC6DR (MFR=2.5), BC6C (MFR=2.5), BC8 (MFR=1.8), BC03HRS (MFR=30)
(4) Manufactured by Mitsui Chemical, Inc. (Mitsui Polypro)
Propylene homopolymer: J139 (MFR=50), J136 (MFR=20), CJ700 (MFR=10), J108M (MFR=45), J107G (MFR=30), J106G (MFR=15), J105G (MFR=9), S119 (MFR=50), S128G (MFR=50), J105H (MFR=9)
Propylene-ethylene block copolymer: J709UG (MFR=55), J708UG (MFR=45), J830HV (MFR=30), J717ZG (MFR=32), J707EG (MFR=30), J707G (MFR=30), J715M (MFR=9), J705UG (MFR=9), J704UG (MFR=5), J702LB (MFR=1.8)
Propylene-ethylene random copolymer: J229E (MFR=52), J226E (MFR=20)

(I-2) Acid

As the acid used to modify the above polyolefin-based resin, an acid having a carboxyl group or its derivative (e.g. anhydride) such as a carboxylic acid or its derivative can be given.

An unsaturated carboxylic acid or its derivative is more preferable since an unsaturated carboxylic acid can be added to the polyolefin-based resin more readily as compared with a saturated carboxylic acid.

As examples of the unsaturated carboxylic acid or its derivative, acrylic acid, methacrylic acid, maleic acid, nadic acid, fumaric acid, itaconic acid, maleic anhydride, nadic anhydride, itaconic anhydride, and the like can be given.

An unsaturated carboxylic acid or its derivative having a melting point of 30 to 280° C. is more preferable, with an unsaturated carboxylic acid or its derivative having a melting point of 50 to 210° C. being particularly preferable.

Of these, maleic acid or maleic anhydride is most preferable.

The amount of acid used for modification is normally 0.1 to 30 parts by mass, preferably 0.2 to 6 parts by mass, more preferably 0.3 to 4 parts by mass, still more preferably 0.4 to 2 parts by mass, particularly preferably 0.5 to 1 parts by mass, and most preferably 0.6 to 0.9 parts by mass with respect to the unmodified polyolefin-based resin. If the amount of acid is less than 0.1 parts by mass, the amount of addition may be insufficient. If the amount exceeds 30 parts by mass, the amount of by-products or unreacted products is increased, thereby resulting in deterioration in performance.

(I-3) Acid-Modified Polyolefin-Based Resin

As the acid-modified polyolefin-based resin, an acid-modified polypropyrene-based resin modified with a carboxylic acid or its derivative is preferable, with a maleic acid-modified polypropylene-based resin being particularly preferable.

It is essential that the acid-modified polyolefin-based resin have the following properties (a) to (c). It is preferable that the acid-modified polyolefin-based resin have properties or additives given in (d) and subsequent items.

(a) The amount of components extractable with boiling methyl ethyl ketone (MEK) is 8 mass % or less, preferably 6 mass % or less, more preferably 4 mass % or less, still more preferably 3 mass % or less, particularly preferably 2 mass % or less, and most preferably 1 mass % or less. If the amount of components extractable with boiling methyl ethyl ketone (MEK) exceeds 8 mass %, low-molecular-weight polar components may be bonded to a coupling agent used for glass fiber treatment. If glass fibers are treated with such a polyolefin-based resin to prepare a reinforced polypropylene-based resin, a molded article formed of the resulting polypropylene-based resin may exhibit insufficient fatigue strength under oscillation.

(a-1) Method for Measuring Amount of Components Extractable with Boiling Methyl Ethyl Ketone An acid-modified polyolefin-based resin (sample) is pulverized using a mortar and extracted with boiling methyl ethyl ketone for six hours using a Soxhlet extractor. The mass of the extract is measured, and the amount of components extractable with boiling methyl ethyl ketone is calculated by the following formula.

Amount of components extractable with boiling methyl ethyl ketone (mass %)=(mass of extract)/(original mass of sample)

(a-2) Method for Removing Components Soluble in Boiling Methyl Ethyl Ketone

The method for reducing the amount of components soluble in boiling MEK (low-molecular-weight polar components) to 8 mass % or less is not particularly limited. For example, the following method may be used.

(1) Degassing: reducing pressure through vent (when using extruder), heating at reduced pressure (vacuum), or drying with hot air (2) Washing: washing with solvent, washing with steam, or washing with warm water (3) Purification: the resin is dissolved in a heated solvent (paraxylene, xylene, toluene, benzene, n-heptane, chlorobenzene, or the like), and the resulting solution is added to a reprecipitation solvent (acetone, acetone/methanol mixed solvent, or the like) to effect reprecipitation. After filtration, the product is dried under vacuum, for example.

Degassing may be performed (i) during modification (e.g. reducing pressure through a vent when using an extruder or the like), or (ii) after modification (performing heating at reduced pressure, heating under vacuum, drying with hot air, or the like after obtaining the acid-modified polyolefin-based resin). In order to stabilize the quality, it is preferable to perform degassing after modification (ii).

If degassing is performed after modification (ii), the degassing temperature is preferably 50 to 150° C., more preferably 60 to 145° C., and particularly preferably 70 to 140° C. If the degassing temperature is lower than 50° C., removal of components takes time. If the degassing temperature is 150° C. or higher, adhesion of the resin may occur.

Since low-volatile components are removed with difficulty by degassing (1), it is preferable to perform washing (2) or purification (3). Washing using a solvent heated to 30 to 120° C. is preferable on an industrial basis since this step can be performed at low cost. Since components soluble in boiling MEK can be almost completely removed by purification, purification is most preferable in order to improve performance.

It is preferable to suppress production of components soluble in boiling MEK (low-molecular-weight polar components) by changing the production conditions since the removal step can be omitted or simplified. The amount of acid used for modification is preferably 6 parts by mass or less, more preferably 4 parts by mass or less, still more preferably 2 parts by mass or less, particularly preferably 1 part by mass or less, and most preferably 0.9 parts by mass or less with respect to the unmodified polyolefin-based resin (100 parts by mass).

As a reaction initiator used for addition reaction, an organic peroxide is normally used. As the organic peroxide, it is preferable to use an organic peroxide having a one-minute half-life of 80 to 260° C., more preferably 90 to 220° C., even more preferably 100 to 200° C., and particularly preferably 110 to 180° C. A plurality of organic peroxides having a one-minute half-life within the above range may be used in combination. If the one-minute half-life is lower than 80° C., since the organic peroxide decomposes rapidly, the amount of organic peroxide must be increased, whereby the amount of components soluble in boiling MEK may be increased. If the one-minute half-life exceeds 260° C., unreacted organic peroxides may remain.

The amount of organic peroxide added is normally 0.01 to 20 parts by mass, preferably 0.03 to 8 parts by mass, more preferably 0.06 to 4 parts by mass, still more preferably 0.1 to 3 parts by mass, particularly preferably 0.12 to 1.5 parts by mass, and most preferably 0.15 to 0.8 parts by mass with respect to the unmodified polyolefin-based resin (100 parts by mass). If the amount is less than 0.01 part, the addition of the organic peroxide may be insufficient. If the amount exceeds 20 parts, the amount of residual peroxides or low-molecular-weight polar components may be increased.

The molecular weight of the organic peroxide is normally 90 to 600, preferably 150 to 500, more preferably 170 to 450, and particularly preferably 180 to 400. It is difficult to handle organic peroxides having a molecular weight outside the above range.

The activation energy of the organic peroxide is normally 100 to 200 kJ/mol, preferably 110 to 180 kJ/mol, more preferably 120 to 170 kJ/mol, and particularly preferably 130 to 160 kJ/mol. If the activation energy is less than 100 kJ/mol, reactivity is lowered. It is difficult to industrially produce an organic peroxide with an activation energy exceeding 200 kJ/mol.

Examples of the organic peroxides include dialkyl peroxides, ketone peroxides, diacyl peroxides, hydroperoxides, peroxyketals, alkyl peresters, percarbonates, and the like. Of these, dialkyl peroxides, alkyl peresters, percarbonates, and peroxyketals are preferable since production of components soluble in boiling MEK is small.

In order to suppress production of low-molecular-weight polar components, it is preferable to reduce the reaction temperature and increase the reaction time.

The reaction temperature (temperature of solution or cylinder) is preferably 100 to 230° C., more preferably 120 to 210° C., still more preferably 130 to 200° C., particularly preferably 135 to 185° C., and most preferably 155 to 175° C.

If the reaction temperature is lower than 100° C., addition reaction may not sufficiently proceed. If the reaction temperature exceeds 230° C., decomposition reaction may proceed too rapidly.

The relationship between the one-minute half-life ($t_{1/2}$) of the organic peroxide and the reaction temperature ($t_a$) is normally $t_{1/2}-80 < t_a < t_{1/2}+50$, preferably $t_{1/2}-30 < t_a < t_{1/2}+40$, more preferably $t_{1/2}-20 < t_a < t_{1/2}+30$, and particularly preferably $t_{1/2}-15 < t_a < t_{1/2}+20$.

The reaction time is normally 0.5 to 300 minutes, preferably 1 to 180 minutes, more preferably 1.5 to 30 minutes, still more preferably 2 to 15 minutes, particularly preferably 2.5 to 10 minutes, and most preferably 3 to 6 minutes. When conducting the reaction using an extruder, the reaction time may be increased by changing the extrusion conditions (decreasing the discharge rate, for example), increasing the L/D ratio of the extruder, or increasing the number of kneading operations. If the reaction time is shorter than 0.5 minutes, a large amount of unreacted products or by-products may be produced, resulting in deterioration in properties. If the reaction time is 300 minutes or longer, industrial application is difficult due to a decrease in productivity.

(b) The number average molecular weight (Mn) measured by gel permeation chromatography (GPC) is 6,000 to 48,000, preferably 8,000 to 46,000, more preferably 11,000 to 42,000, still more preferably 13,000 to 38,000, particularly preferably 15,000 to 34,000, and most preferably 17,000 to 32,000. If the number average molecular weight (Mn) is less than 6,000, the length of the polyolefin chain of the acid-modified polyolefin-based resin may become insufficient, whereby the strength between the acid-modified polyolefin-based resin and the unmodified polyolefin-based resin may become insufficient. As a result, if glass fibers are treated with such an acid-modified polyolefin-based resin to prepare a reinforced polypropylene-based resin, a molded article formed of the resulting polypropylene-based resin may exhibit insufficient fatigue strength under oscillation. If the number average molecular weight exceeds 48,000, the acid-modified polyolefin-based resin may not be dispersed uniformly with a silane coupling agent, whereby fatigue strength under oscillation may be lowered, emulsification may become difficult, or the resin may not be used for glass fiber treatment.

(c) The amount of an acid which has been added (components insoluble in MEK), measured by Fourier transform infrared spectroscopy (FT-IR), is 0.1 to 12 mass %, preferably 0.3 to 10 mass %, more preferably 0.4 to 8 mass %, still more preferably 0.5 to 6 mass %, particularly preferably 0.7 to 3.8 mass %, and most preferably 0.9 to 2.9 mass %. If the amount is less than 0.1 mass %, it may be difficult for the acid-modified polyolefin-based resin to be bonded to glass fibers, or emulsification may become difficult. If the amount is 12 mass % or more, the number of functional groups per molecule is increased to a large extent. As a result, if glass fibers are treated with such an acid-modified polyolefin-based resin to prepare a fiber-reinforced polypropylene-based resin, a molded article formed of the resulting fiber-reinforced polypropylene-based resin may exhibit insufficient fatigue strength under oscillation.

(c-1) Method for Measuring Amount of Acid Added

The amount of acid added is measured as follows. A relational expression between the peak area and the amount of maleic acid is calculated using dodecylsuccinic anhydride and concentration-adjustment polypropylene powder (H-700 manufactured by Idemitsu Kosan Co., Ltd) to obtain a calibration curve. An acid-modified polyolefin-based resin sample is pre-heated for 10 minutes by hot pressing at 230° C., pressed for four minutes (5 MPa), and cold-pressed for three minutes (5 MPa) to obtain a film with a thickness of about 0.1 mm.

Part of the film (15 mm×20 mm×0.1 mm) is immersed in 100 ml of methyl ethyl ketone (MEK) at 70° C. for three hours. After washing, the film is removed, air-dried, and vacuum-dried at 130° C. for two hours.

The FT-IR transmission spectrum of the film is measured within two hours after drying, and the peak area of the FT-IR spectrum at 1670 to 1810 cm$^{-1}$ is calculated and compared with the above calibration curve to determine the amount of carboxylic acid added to the maleic acid-modified polypropylene-based resin (components insoluble in MEK).

(d) The glass fiber treatment resin of the invention is preferably used in the form of an aqueous solution, an emulsion, or an aqueous dispersion. In this case, the resin may contain a lubricant or an anti-static agent such as a wax or a surfactant or other resins such as a urethane resin, as described in JP-A-2003-191236.

(e) The molecular weight distribution (Mw/Mn) measured by gel permeation chromatography (GPC) is normally 2 to 10, preferably 2 to 6, more preferably 2.2 to 5, still more preferably 2.4 to 4.5, and most preferably 2.5 to 4. If the molecular weight distribution (Mw/Mn) is less than 2, moldability may deteriorate. A molecular weight distribution exceeding 10 may increase the amount of low-molecular-weight components having a polar group, resulting in insufficient fatigue strength under oscillation.

(f) The amount of components with a molecular weight of 10,000 or less measured by gel permeation chromatography (GPC) is normally 20% or less, preferably 15% or less, more preferably 12% or less, still more preferably 10% or more, and particularly preferably 8% or less. If the amount of components with a molecular weight of 10,000 or less exceeds 20%, the amount of low-molecular-weight components having a polar group is increased, which may result in insufficient fatigue strength under oscillation.

(g) The amount of components with a molecular weight of 5,000 or less measured by the gel permeation chromatography (GPC) is normally 10% or less, preferably 6% or less, more preferably 4% or less, and particularly preferably 3% or less. If the amount of components with a molecular weight of 5,000 or less exceeds 10%, the amount of low-molecular-weight polar components having a polar group is increased, which may result in insufficient fatigue strength under oscillation.

(h) The "average number of functional groups per molecule", calculated based on the amount of functional groups added (amount of acid added) measured by Fourier transform infrared spectroscopy (FT-IR) and the number average molecular weight (Mn) measured by GPC, is normally 1.0 to 10 (number/molecule), preferably 1.2 to 7, more preferably 1.4 to 5, still more preferably 1.6 to 4, and particularly preferably 1.8 to 3. If the "average number of functional groups per molecule" is 1.0 or less, emulsification of the resin may become difficult. If the "average number of functional groups per molecule" is 10 or more, a number of bonding points may occur, resulting in a decrease in strength.

(h-1) Method for Calculating "Average Number of Functional Groups Per Molecule"

$$\text{Number of functional groups per molecule} = (0.01 \times A/Mr)/(1/Mn) = 0.01 \times A \times Mn/Mr$$

In the above formula, A is the amount of functional groups added (mass %), Mr is the molecular weight of the functional group, and Mn is the number average molecular weight of the functional group-containing polyolefin-based resin.

When the functional group is a maleic acid group (Mr=98), the number of functional groups per molecule is almost equal to A×Mn/10,000.

(i) A change in the amount of acid added measured by Fourier transform infrared spectroscopy (FT-IR) before and after treatment in methyl ethyl ketone (MEK) at 70° C. for three hours is 1.6 mass % or less, preferably 0.8 mass % or less, more preferably 0.6 mass % or less, even more preferably 0.4 mass % or less, particularly preferably 0.2 mass % or less, and most preferably 0.1 mass % or less. If the change in the amount of acid added exceeds 1.6 mass %, the amount of low-molecular-weight components having a polar group is increased, which may result in insufficient fatigue strength under oscillation.

(j) The amount of gel (amount of gel which does not pass through a millipore filter with a pore size of 5 μm by melt pressure permeation method) is 2 mass % or less, preferably 1 mass % or less, more preferably 0.5 mass % or less, and particularly preferably 0.2 mass % or less. If the amount of gel exceeds 2 mass %, a molded article may have poor appearance due to protrusions (unmolten products in the resin which form small protrusions on the surface of the molded article to cause the appearance to deteriorate), or emulsification may become difficult.

(k) The content of each of toluene, xylene, formaldehyde, acetaldehyde, or the like contained as a volatile organic compound is normally 1,000 ppm or less, preferably 700 ppm or less, more preferably 300 ppm or less, still more preferably 100 ppm or less, and particularly preferably 30 ppm or less. If the content of the volatile organic compound is 300 ppm or more, the volatile organic compound may be generated from a molded article.

(l) The yellow index (YI: measured according to JIS K7105-1981) is normally 0 to 80, preferably 0 to 50, more preferably 0 to 30, particularly preferably 0 to 20, and most preferably 0 to 15. If the yellow index is 80 or more, a molded article may yellow to have poor appearance.

(m) The amount of low-molecular-weight components (measured by dissolving the resin in xylene, washing the resulting slurry with acetone, and subjecting the washing solution to condensation and evaporation to dryness, and measuring the weight of the resulting product) is normally 8 mass % or less, preferably 3 mass % or less, more preferably 1 mass % or less, still more preferably 0.5 mass % or less, even still more preferably 0.3 mass % or less, and most preferably 0.1 mass % or less. If the amount of low-molecular-weight components exceeds 8 mass %, impact strength may be lowered due to a decrease in the molecular weight, or the amount of low-molecular-weight components having a polar group may be increased, whereby fatigue strength under oscillation may become insufficient.

(n) The volatile content (comparing the weights before and after overdrying) is normally 2.0 mass % or less, preferably 1.5 mass % or less, more preferably 1.0 mass % or less, still more preferably 0.5 mass % or less, particularly preferably 0.3 mass % or less, and most preferably 0.2 mass % or less. If the volatile content exceeds 2.0 mass %, the commercial value of the resulting product may be impaired due to generation of odors. In addition, fatigue strength under oscillation and tensile strength may be lowered.

(o) The crystallization temperature Tc (C) measured using a differential scanning calorimeter (DSC) is normally 80 to 130° C., preferably 90 to 125° C., more preferably 100 to 122° C., still more preferably 105 to 120° C., and particularly preferably 110 to 118° C. If the crystallization temperature (Tc) is lower than 80° C. or higher than 130° C., a molded article may exhibit insufficient properties (strength).

(p) The limiting viscosity ($\eta$) (measured at 135° C. in decalin) is normally 0.2 to 1.8, preferably 0.25 to 1.00, more preferably 0.3 to 0.9, still more preferably 0.35 to 0.7, particularly preferably 0.37 to 0.65, and most preferably 0.4 to 0.6. If the limiting viscosity is less than 0.2, impact strength may be lowered due to a decrease in the molecular weight, or the amount of low-molecular-weight components having a polar group may be increased, whereby fatigue strength under oscillation may become insufficient. If the limiting viscosity exceeds 1.8, emulsification for surface treatment may become difficult, or properties may deteriorate.

An increase in the limiting viscosity (measured at 135° C. in decalin) before and after purification is normally 0.18 or less, preferably 0.12 or less, more preferably 0.09 or less, still more preferably 0.06 or less, particularly preferably 0.03 or less, and most preferably 0.02 or less. If an increase in the limiting viscosity exceeds 0.18, the amount of low-molecular-weight polar components may be increased, whereby fatigue strength under oscillation or tensile strength may be decreased.

(q) The acid-modified polyolefin-based resin contains an inorganic neutralizer in an amount of 0.001 to 0.5 mass %, preferably 0.01 to 0.1 mass %, and more preferably 0.05 mass %. If the amount of inorganic neutralizer is 0.01 mass % or less, a die of a molding machine or the like may be corroded due to the presence of a catalyst residue. If the amount of inorganic neutralizer is 0.5 mass % or more, strength may be lowered. Examples of the inorganic neutralizer include those described in JP-A-2003-238748 and the like. Of these, hydrotalcites are particularly preferable.

(I-4) Method for Producing Acid-Modified Polyolefin-Based Resin

As the method for producing the acid-modified polypropylene-based resin (functional group-containing polyolefin-based resin), a known method described in JP-A-8-143739, JP-A-2002-20560, JP-A-7-316239, JP-A-8-127697, JP-A-7-232324, or the like may be used.

The production method is not particularly limited. When producing a maleic acid-modified polypropylene-based resin, (1) a method of allowing an organic peroxide, maleic acid, and polypropylene to react in a solvent (solution method), (2) a method of melt-kneading an organic peroxide, maleic acid, and polypropylene using a Banbury mixer, an extruder, or the like (melting method), (3) a method of allowing maleic acid to react with thermally-decomposed polypropylene (thermal decomposition method), and the like can be given. In the solution method (1) or the thermal decomposition method (3), since the solvent or catalyst residues may remain, problems such as generation of odors may occur. Therefore, the melting method (2) is preferable. It is particularly preferable to produce the acid-modified polyolefin-based resin by melt-kneading the components using an extruder due to high productivity.

In order to obtain an acid-modified polyolefin-based resin having the above properties, the molecular weight of the polypropylene may be adjusted (see JP-A-2002-20560), the reaction temperature or the concentrations of maleic acid and an organic peroxide may be adjusted, or a crosslinked polymer (polybutadiene or the like) may be added (see JP-A-8-143739), for example.

Various additives may be added to the treatment resin of the invention insofar as the effects of the invention are not impaired. As examples of the additives, antioxidants, neutralizers, nucleating agents, lubricants, pH adjusters, and the like can be given.

II. Surface-Treated Glass Fiber

The surface-treated glass fiber of the invention is processed with a sizing agent containing the acid-modified polyolefin-based resin for glass fiber treatment of the invention, in which the fiber diameter of the glass fiber is 3 to 30 μm.

(II-1) Sizing Agent

The sizing agent used in the invention contains the acid-modified polyolefin-based resin for glass fiber treatment of the invention and a silane coupling agent.

In the sizing agent used in the invention, the glass fiber treatment resin of the invention has a function of binding glass fibers to be treated to facilitate handling and suppressing breakage of the glass fibers. The silane coupling agent has a function of ensuring firm bonding between the glass fiber surface and the glass fiber treatment resin.

A neutralizer or a lubricant may be added to the sizing agent used in the invention. As the neutralizer, amines such as ethylenediamine are preferable (see JP-A-2003-253563).

The sizing agent may be adjusted using a known method such as a method of using polyolefin particles with an average particle diameter of 3 to 10 μm (JP-A-2003-277103), a method of using a polyurethane resin emulsion and a modified polypropylene resin emulsion or the like in combination (JP-A-2000-281391), a method of using an amino group/amide group-containing compound (JP-T-2004-505883), or a method of using a stabilizer or the like (JP-T-09-510427).

(II-2) Silane Coupling Agent

The silane coupling agent used in the invention is preferably an aminosilane coupling agent. A diaminosilane coupling agent is particularly preferable.

Specific examples of the silane coupling agent used in the invention include a silane-based coupling agent, a titanate-based coupling agent, an aluminum-based coupling agent, a chromium-based coupling agent, a zirconium-based coupling agent, a borane-based coupling agent, and the like. Of these, the silane-based coupling agent and the titanate-based coupling agent are preferable, with the silane-based coupling agent being particularly preferable.

As examples of the silane-based coupling agent, triethoxysilane, vinyltris(β-methoxyethoxy)silane, γ-methacryloxypropyltrimethoxysilane, γ-glycidoxypropyltrimethoxysilane, β-(3,4-epoxycyclohexyl) ethyltrimethoxysilane, N-β-(aminoethyl)-γ-aminopropyltrimethoxysilane, N-β-(aminoethyl)-γ-aminopropyl methyldimethoxysilane, γ-aminopropyltriethoxysilane, N-phenyl-γ-aminopropyltrimethoxysilane, γ-mercaptopropyltrimethoxysilane, γ-chloropropyltrimethoxysilane, and the like can be given. Of these, aminosilanes such as γ-aminopropyltriethoxysilane and N-β-(aminoethyl)-γ-aminopropyltrimethoxysilane are preferable.

As examples of commercially available products of the silane coupling agent which may be used in the invention, products shown in Table 1 can be given. These products are manufactured by Shin-Etsu Chemical Co., Ltd. Of these, KBE-903 and KBM-603 are preferable.

TABLE 1

Product name of silane coupling agent

| Functional Group | Product Name | Chemical Name |
|---|---|---|
| Vinyl | KA-1003 | Vinyltrichlorosilane |
| | KBM-1003 | Vinyltrimethoxysilane |
| | KBE-1003 | Vinyltriethoxysilane |
| Epoxy | KBM-303 | 2-(3,4-epoxycyclohexyl)ethyltrimethoxysilane |
| | KBM-403 | 3-Glycidoxypropyltrimethoxysilane |
| | KBE-402 | 3-Glycidoxypropylmethyldiethoxysilane |
| | KBE-403 | 3-Glycidoxypropyltriethoxysilane |
| Styryl | KBM-1403 | p-Styryltrimethoxysilane |
| Methacryoxy | KBM-502 | 3-Methacryloxypropylmethyldimethoxysilane |
| | KBM-503 | 3-Methacryloxypropyltrimethoxysilane |
| | KBE-502 | 3-Methacryloxypropylmethyldiethoxysilane |
| | KBE-503 | 3-Methacryloxypropyltriethoxysilane |
| Acryoxy | KBM-5103 | 3-Acryloxypropylytrimethoxysilane |
| Amino | KBM-602 | N-2-(Aminoethyl)-3-aminopropylmethyldimethoxysilane |
| | KBM-603 | N-2-(Aminoethyl)-3-aminopropyltrimethoxysilane |
| | KBE-603 | N-2-(Aminoethyl)-3-aminopropyltriethoxysilane |
| | KBM-903 | 3-Aminopropyltrimethoxysilane |
| | KBE-903 | 3-Aminopropyltriethoxysilane |
| | KBE-9103 | 3-Triethoxysilyl-N-(1,3-dimethyl-butylidene)propylamine |
| | KBM-573 | N-phenyl-3-aminopropyltrimethoxysilane |
| | KBM-575 | N-(Vinylbenzyl)-2-aminoethyl-3-aminopropyl-trimethoxysilane hydrochloride |
| | KBM-6123 | Specific aminosilane |
| Ureido | KBE-585 | 3-Ureidopropyltriethoxysilane |
| Chloropropyl | KBM-703 | 3-Chloropropyltrimethoxysilane |
| Mercapto | KBM-802 | 3-Mercaptopropylmethyldimethoxysilane |
| | KBM-803 | 3-Mercaptopropyltrimethoxysilane |
| Sulfide | KBE-846 | Bis(triethoxysilylpropyl)tetrasulfide |
| Isocyanate | KBE-9007 | 3-Isocyanatepropyltriethoxysilane |

(II-3) Mixing Ratio of Surface Treatment Resin and Silane Coupling Agent

The ratio of the surface treatment resin and the silane coupling agent (=mass of glass fiber treatment resin/mass of silane coupling agent) is normally 1 to 20, preferably 2 to 10, more preferably 4 to 8, and particularly preferably 5 to 7. If the above ratio is smaller than 1, the bundling properties may be lowered due to an insufficient amount of the glass fiber treatment resin, which causes the fibers to break during production of pellets. If the above ratio exceeds 20, the resulting molded article may exhibit decreased strength due to an insufficient amount of the silane coupling agent.

(II-4) Glass Fiber

The glass fibers used in the invention are not particularly limited. C-glass or E-glass is preferable, with E-glass being particularly preferable.

The glass fibers may be in a known form. The glass fibers may be in a rolled form such as a roving, cake, or yarn, or may be in the form of a chopped strand, milled fibers, cut fibers, cloth, mat, tape, or the like. The glass fibers in a rolled form are preferable to facilitate production of a molded article with a large fiber length. The glass fibers in the form of an unstranded roving (direct roving) or a cake are particularly preferable.

The fiber diameter of the glass fibers is normally 3 to 30 μm, preferably 9 to 30 μm, more preferably 11 to 30 μm, still more preferably 15 to 30 μm, and particularly preferably 16 to 24 μm. If the fiber diameter is less than 3 μm, the fibers may readily break, or production of the glass fibers becomes difficult, resulting in an increase in cost. If the fiber diameter exceeds 30 μm, the glass fiber has a reduced aspect ratio. A molded article produced from the fiber-reinforced polyolefin-based resin using such glass fibers may exhibit insufficient fatigue strength under oscillation.

(II-5) Mixing Ratio of Sizing Agent and Glass Fibers (1) The amount of the sizing agent adhering to the glass fibers (ignition loss, average value) is 0.03 to 2.0 mass %, preferably 0.05 to 1.0 mass %, more preferably 0.2 to 0.8 mass %, still more preferably 0.3 to 0.6 mass %, particularly preferably 0.3 to 0.5 mass %, and most preferably 0.36 to 0.44 mass % for 100 mass % of the glass fibers used. If the amount of the sizing agent adhering to the glass fibers is less than 0.03 mass %, the density of the coupling agent may be insufficient to decrease the strength of a molded article. Moreover, the bundling properties of the glass fibers may be lowered to cause the glass fibers to readily break. When the amount exceeds 2.0 mass %, excessive silane coupling agents may undergo self-condensation and may bond to the acid-modified polypropylene-based resin to inactivate functional groups, resulting in lowered strength. Moreover, production cost is increased.

(2) The amount of the silane coupling agent adhering to the glass fibers is normally 0.01 to 0.5 mass %, preferably 0.03 to 0.2 mass %, more preferably 0.04 to 0.16 mass %, still more preferably 0.05 to 0.12 mass %, and particularly preferably 0.06 to 0.08 mass %. If the amount of the silane coupling agent adhering to the glass fibers is less than 0.01 mass %, the strength of a molded article may be lowered. If the amount exceeds 0.5 mass %, fiber breakage may occur frequently during the production of long fiber-reinforced polyolefin-based resin pellets, or impregnation of the resin with the silane coupling agent may be insufficient. In addition, a molded article may exhibit lowered strength.

(2-1) Method for Calculating Amount of Silane Coupling Agent Adhering

The amount (C) of the silane coupling agent adhering is calculated by the following formula.

$$\text{Amount } (C) \text{ of silane coupling agent adhering (mass \%)} = Ca \times (Kc/Ka)$$

In the above formula, Ka (mass %) is the total solid content of the sizing agent, Kc (mass %) is the amount of the silane coupling agent used, and Ca (mass %) is the amount of the sizing agent adhering to the glass fibers.

(3) The surface density (N) of the silane coupling agent on the surfaces of the glass fibers calculated from the amount of the sizing agent adhering to the glass fibers is normally $1.0 \times 10^{-5}$ to $12 \times 10^{-5}$ mol/m$^2$, preferably $1.6 \times 10^{-5}$ to $8.0 \times 10^{-5}$ mol/m$^2$, more preferably $2.4 \times 10^{-5}$ to $8.0 \times 10^{-5}$ mol/m$^2$, still more preferably $2.7 \times 10^{-5}$ to $8.0 \times 10^{-5}$ mol/m$^2$, particularly preferably $2.7 \times 10^{-5}$ to $6.0 \times 10^{-5}$, and most preferably $2.8 \times 10^{-5}$ to $4.0 \times 10^{-5}$ mol/m$^2$. If the surface density (N) of the silane coupling agent is less than $1.0 \times 10^{-5}$ mol/m$^2$, formation of bonding points on the glass surface may be insufficient, and the fatigue strength under oscillation or the static strength of a molded article may be lowered. If the surface density of the silane coupling agent (N) is greater than $12 \times 10^{-5}$ mol/m$^2$, condensation reaction between the silane coupling agents may be increased, whereby the interfacial strength of the glass fibers may be lowered. As a result, the fatigue strength under oscillation or the static strength of a molded article may be lowered.

(3-1) Method for Calculating Surface Density (N) of Silane Coupling Agent

The surface density (N) of the silane coupling agent is calculated by the following formula.

$$N(\text{mol}/m^2) = \frac{C(\text{mass \%})/\text{surface area per mass of glass fiber (cm}^2)}{m}$$

$$= \frac{(C/100)/[\{(d/10000\times\prod)\}/\{(d/2/10000)^2\times\prod\times g\}]}{m\times 10000}$$

Where,
d (μm): glass fiber diameter
g (g/cm³): specific gravity of glass fiber
m: molecular weight of silane coupling agent
C (mass %): amount of silane coupling agent adhering (GF mass standard)

(II-6) Glass Fiber Surface Treatment Method

The surface-treated glass fibers of the invention may be produced by applying a sizing agent solution (generally aqueous solution) the glass fibers using a roller or the like or spraying the sizing agent solution onto the glass fibers, rolling the glass fibers up into a desired shape, and drying the glass fibers.

As the glass fiber surface treatment method, a known method may be used without limitations such as a method in which fiber bundles subjected to sizing process are rolled up in the shape of a cake and dried (Japanese Patent No. 3453393), a method in which chopped strands are cut and directly dried or collected and dried in a fluid bed dryer for continuous process (JP-T-09-510427).

In view of productivity and quality stability, it is preferable that the glass fibers be subjected to sizing process immediately after spinning, and fiber bundles formed of 400 to 10,000 fibers are rolled up in the shape of a roving or a cake, followed by drying. The drying temperature is normally 60 to 180° C., preferably 80 to 160° C., more preferably 90 to 150° C., and particularly preferably 100 to 140° C.

The drying time is normally 1 to 100 hours, preferably 2 to 80 hours, more preferably 3 to 60 hours, still more preferably 6 to 40 hours, and particularly preferably 10 to 30 hours.

III. Fiber-Reinforced Polyolefin-Based Resin

The fiber-reinforced polyolefin-based resin of the invention (hereinafter referred to as "reinforced resin of the invention") contains the surface-treated glass fibers of the invention and a polyolefin-based resin.

The reinforced resin of the invention substantially contains the above surface-treated glass fibers and a polyolefin-based resin and/or an acid-modified polyolefin-based resin.

(III-1) Surface-Treated Glass Fiber

The surface-treated glass fibers used in the reinforced resin of the invention have an aspect ratio (average fiber length/ average fiber diameter) of 50 to 6,000, preferably 70 to 2000, more preferably 150 to 1500, and particularly preferably 250 to 1200. If the aspect ratio is smaller than 50, the resulting molded article may exhibit insufficient strength. An aspect ratio exceeding 6,000 may result in lowered fluidity during molding.

(III-2) Polyolefin-Based Resin

As the polyolefin-based resin used for the reinforced resin of the invention, a polyolefin-based resin, in particular, a propylene-based homopolymer or an ethylene-propylene block copolymer is preferable. The polyolefin-based resin is preferably a propylene homopolymer.

The polypropylene-based resin may be used either singly or in combination of two or more. The most preferable polypropylene-based resin is a polypropylene-based resin which is not subjected to a decomposition step with an organic peroxide. When using a polypropylene-based resin subjected to a decomposition step with an organic peroxide, it is preferable to use a polypropylene-based resin prepared by using the organic peroxide in an amount of preferably 0.5 parts by mass or less, more preferably 0.1 part by mass or less, still more preferably 0.05 parts by mass or less, and particularly preferably 0.02 parts by mass or less for the polypropylene-based resin. If a polypropylene-based resin prepared by using the organic peroxide in an amount exceeding 0.5 parts by mass, the amount of by-products may be increased to generate odors, or the hue of the resin may deteriorate.

It is preferable that the polyolefin-based resin have the following properties.

(i) The melt flow rate (MFR) is 1 to 600 g/10 min, preferably 10 to 400 g/10 min, more preferably 30 to 300 g/10 min, still more preferably 40 to 200 g/10 min, particularly preferably 50 to 150 g/10 min, and most preferably 60 to 120 g/10 min. If the MFR is less than 1 g/10 min, molding may become difficult. Moreover, production of the fiber-reinforced polyolefin-based resin may become difficult. An MFR exceeding 600 g/10 min may result in a lowering in toughness or impact strength.

(ii) The stereoregurarity (mmmm fraction) of the homopolymerized part is normally 90% or more, preferably 93% or more, more preferably 96% or more, and particularly preferably 98% or more. If the stereoregurarity (mmmm fraction) of the homopolymerized part is less than 90%, rigidity (flexural modulus, tensile modulus) may be insufficient.

(iii) The crystallization temperature Tc (B) measured using a differential scanning calorimeter (DSC) is normally 80 to 130° C., preferably 90 to 125° C., more preferably 100 to 122° C., still more preferably 105 to 120° C., and particularly preferably 110 to 118° C. If the crystallization temperature Tc (B) is lower than 80° C. or higher than 130° C., a molded article may have insufficient properties (strength).

(iv) The amount of component with a molecular weight of 1,000,000 or more measured by gel permeation chromatography (GPC) is normally 0.5% or more, preferably 1% or more, and particularly preferably 2% or more. If the amount of components with a molecular weight of 1,000,000 or more is less than 0.5%, rigidity (flexural modulus, tensile modulus) or strength (flexural strength, tensile strength) may be insufficient.

(v) The molecular weight distribution (Mw/Mn) measured by gel permeation chromatography (GPC) is normally 2 to 10, preferably 2 to 6, and particularly preferably 3 to 5. If the molecular weight distribution (Mw/Mn) is less than 2, moldability may deteriorate. If the molecular weight distribution exceeds 10, the amount of low-molecular-weight components having a polar group may be increased, resulting in insufficient fatigue strength under oscillation.

(vi) The polyolefin-based resin contains an inorganic neutralizer in an amount of 0.001 to 0.5 mass %, preferably 0.01 to 0.1 mass %, and more preferably 0.05 mass %. If the content of the inorganic neutralizer is 0.001 mass % or less, a die of a molding machine or the like may be corroded due to a catalyst residue. If the content of the inorganic neutralizer is 0.5 mass % or more, strength may be decreased. Examples of the inorganic neutralizer include those described in JP-A-2003-238748 and the like. Of these, hydrotalcites are particularly preferable.

(III-3) Examples of Commercially Available Products of Polypropylene-Based Resin As examples of commercially available products of the polypropylene-based resin used for the reinforced resin of the invention, the same products as described in the above description (I-1) concerning the treatment resin of the invention can be given.

(III-4) Acid-Modified Polyolefin-Based Resin

As the unmodified polyolefin-based resin for producing the acid-modified polyolefin-based resin used for the reinforced resin of the invention, a polypropylene-based resin, in particular, a propylene homopolymer or an ethylene-propylene random copolymer is preferable, with the propylene homopolymer being particularly preferable.

As the acid used to modify the polyolefin-based resin, the same acids as described for the surface treatment resin of the invention can be given.

As the acid-modified polyolefin-based resin used for the reinforced resin of the invention, a maleic acid-modified polypropylene-based resin is preferable, which may be produced using the method described for the surface treatment resin of the invention.

It is preferable that the acid-modified polyolefin-based resin have the following properties.

(I) The amount of components extractable with boiling methyl ethyl ketone (MEK) is 8 mass % or less, preferably 6 mass % or less, more preferably 4 mass % or less, still more preferably 3 mass % or less, particularly preferably 2 mass % or less, and most preferably 1 mass % or less.

If the amount of components extractable with MEK exceeds 8 mass %, low-molecular-weight polar components are bonded to the coupling agent on the glass surface. If such an acid-modified polyolefin-based resin is used, the resulting molded article may exhibit insufficient fatigue strength under oscillation.

(II) The number average molecular weight (Mn) measured by gel permeation chromatography (GPC) is 10,000 to 80,000, preferably 12,000 to 70,000, more preferably 14,000 to 60,000, still more preferably 16,000 to 54,000, particularly preferably 18,000 to 48,000, and most preferably 20,000 to 42,000.

If the number average molecular weight (Mn) is less than 10,000, the acid-modified polyolefin-based resin may not be bonded to the surface of the glass fibers, or the toughness of the molded article may be reduced due to the presence of low-molecular-weight components. If the number average molecular weight exceeds 80,000, fluidity may be lowered, which results in difficulty in molding.

(III) The amount of an acid which has been added (components insoluble in MEK) measured by Fourier transform infrared spectroscopy (FT-IR) is 0.1 to 12 mass %, preferably 0.3 to 10 mass %, more preferably 0.4 to 8 mass %, still more preferably 0.5 to 2.9 mass %, particularly preferably 0.6 to 2.9 mass %, and most preferably 0.7 to 2.0 mass %.

If the amount of acid added is less than 0.1 mass %, the strength of the resulting molded article may be lowered. If the amount of acid added exceeds 12 mass %, dispersion may be insufficient.

(IV) A "change in the amount of acid added before and after treatment in methyl ethyl ketone (MEK) at 70° C. for three hours" measured by Fourier transform infrared spectroscopy (FT-IR) is 1.6 mass % or less, preferably 0.8 mass % or less, more preferably 0.4 mass % or less, still more preferably 0.3 mass %, particularly preferably 0.2 mass % or less, and most preferably 0.1 mass % or less.

If a change in the amount of acid added exceeds 1.6 mass %, the amount of low-molecular-weight polar components may be increased, which may result in insufficient fatigue strength under oscillation of a molded article.

(v) The molecular weight distribution (Mw/Mn) measured by gel permeation chromatography (GPC) is normally 2 to 10, preferably 2 to 6, more preferably 2.2 to 5, still more preferably 2.4 to 4.5, and particularly preferably 2.5 to 3.5. If the molecular weight distribution (Mw/Mn) is less than 2, moldability may deteriorate. If the molecular weight distribution exceeds 10, the amount of low-molecular-weight components having a polar group may be increased, resulting in insufficient fatigue strength under oscillation.

(VI) The content of components with a molecular weight of 10,000 or less measured by gel permeation chromatography (GPC) is normally 20% or less, preferably 12% or less, more preferably 10% or more, even more preferably 8% or less, and particularly preferably 7% or less. If the content of components with a molecular weight of 10,000 or less exceeds 20%, the amount of low-molecular-weight components having a polar group may be increased, which may result in insufficient fatigue strength under oscillation.

(VII) The content of components with a molecular weight of 5,000 or less measured by the gel permeation chromatography (GPC) is normally 10% or less, preferably 6% or less, more preferably 4% or less, and particularly preferably 3% or less. If the content of components with a molecular weight of 5,000 or less exceeds 10%, the amount of low-molecular-weight components having a polar group may be increased, which may result in insufficient fatigue strength under oscillation.

(VIII) The "average number of functional groups per molecule", calculated based on the amount of functional groups added measured by Fourier transform infrared spectroscopy (FT-IR) and the number average molecular weight measured by gel permeation chromatography (GPC), is normally to 0.8 to 10, preferably 1.2 to 7, more preferably 1.4 to 5, still more preferably 1.6 to 4, and particularly preferably 1.8 to 3. If the "average number of functional groups per molecule" is less than 0.8, strength may be insufficient. If the "average number of functional groups per molecule" exceeds 10, aggregation may occur, resulting in difficulty in dispersion.

The method for calculating the "average number of functional groups per molecule" is the same as described above.

(IX) The content of toluene, xylene, formaldehyde, and acetaldehyde which are volatile organic compounds is normally 1,000 ppm or less, preferably 700 ppm or less, more preferably 300 ppm or less, still more preferably 100 ppm or less, and particularly preferably 30 ppm or less. If the content of the volatile organic compounds exceeds 1000 ppm, the volatile organic compounds may be generated from the resulting molded article.

(X) The limiting viscosity (measured at 135° C. in decalin) is normally 0.3 to 1.8, preferably 0.4 to 1.2, more preferably 0.50 to 1.00, still more preferably 0.60 to 0.95, and particularly preferably 0.70 to 0.90. If the limiting viscosity is less than 0.3, impact strength may be decreased due to a lowered molecular weight, or the amount of low-molecular-weight components having a polar group may be increased, which results in insufficient fatigue strength under oscillation. If the limiting viscosity exceeds 1.8, appearance may deteriorate due to insufficient impregnation with the resin.

An increase in the limiting viscosity (measured at 135° C. in decalin) before and after purification is normally 0.18 or less, preferably 0.12 or less, more preferably 0.09 or less, still more preferably 0.06 or less, particularly preferably 0.03 or less, and most preferably 0.02 or less. If an increase in the limiting viscosity exceeds 0.18, the amount of low-molecular-weight polar components may be increased, resulting in insufficient fatigue strength under oscillation.

It is preferable that the limiting viscosity (VI) of the fiber-reinforced polyolefin-based resin be greater than the limiting viscosity (p) of the acid-modified polyolefin-based resin.

(XI) The melt flow rate (MFR) (measured according to ASTM D-1238, load: 2.16 kg, temperature: 230° C.) is normally 20 to 2000, preferably 60 to 1500, more preferably 130 to 1000, even more preferably 180 to 750, and particularly preferably 260 to 550. If the melt flow rate is less than 20, production of the glass fiber-reinforced polypropylene-based resin may be difficult, or appearance may deteriorate due to insufficient impregnation with the resin. If the melt flow rate exceeds 2000, toughness or impact strength may be lowered.

(XII) The crystallization temperature Tc (C) measured using a differential scanning calorimeter (DSC) is normally 80 to 130° C., preferably 90 to 125° C., more preferably 100 to 122° C., still more preferably 105 to 120° C., and particularly preferably 110 to 118° C. Tc (C)<Tc (B)+5° C. is preferable, Tc (C)<Tc (B) is particularly preferable, and Tc (C)<Tc (B)−3° C. is most preferable. Tc (B) is defined above for the reinforced resin of the invention.

(XIII) The amount of residual peroxides is normally 1,000 ppm or less, preferably 500 ppm or less, still more preferably 100 ppm or less, and particularly preferably 50 ppm or less. If the amount of residual peroxides exceeds 1,000 ppm, fluidity during molding may be insufficient.

(XIV) The yellow index (YI: measured according to JIS K7105-1981) is normally 0 to 80, preferably 0 to 50, more preferably 0 to 30, and particularly preferably 0 to 20. If the yellow index is 80 or more, a molded article may yellow to exhibit poor appearance.

(XV) The amount of low-molecular-weight components (measured by dissolving the resin in xylene, washing the resulting slurry with acetone, and subjecting the washing solution to condensation and evaporation to dryness, and measuring the weight of the resulting product) is normally 8 mass % or less, preferably 3 mass % or less, more preferably 1 mass % or less, still more preferably 0.5 mass % or less, particularly preferably 0.3 mass % or less, and most preferably 0.1 mass % or less. If the amount of low-molecular-weight components exceeds 8 mass %, impact strength may be decreased due to a decrease in molecular weight, or the amount of the low-molecular-weight components having a polar group may be increased, which results in insufficient fatigue strength under oscillation.

(XVI) The volatile content (determined by comparing the weights before and after overdrying) is normally 2.0 mass % or less, preferably 1.5 mass % or less, more preferably 1.0 mass % or less, still more preferably 0.5 mass % or less, particularly preferably 0.3 mass % or less, and most preferably 0.2 mass % or less. If the volatile content exceeds 2.0 mass %, the commercial value of the resulting product may be impaired due to generation of odors. In addition, fatigue strength under oscillation and tensile strength may be lowered.

(XVII) The amount of gel (amount of gel which does not pass through a millipore filter with a pore size of 5 µm by melt pressure permeation method) is normally 2 mass % or less, preferably 1 mass % or less, more preferably 0.5 mass % or less, and particularly preferably 0.2 mass % or less. If the amount of gel exceeds 2 mass %, a molded article may have protrusions to have poor appearance.

(III-5) Mixing Ratio of Components

The mixing ratio of (A) the surface-treated glass fiber, (B) the polyolefin-based resin, and (C) the acid-modified polyolefin-based resin in the reinforced resin of the invention are as follows.

(A):[(B)+(C)] is normally 5 to 80:95 to 20, preferably 10 to 70:90 to 30, still more preferably 30 to 59:70 to 41, and particularly preferably 35 to 55:65 to 45. (B)+(C) means the resin components in the reinforced resin. If the amount of the surface-treated glass (A) is less than 5 mass %, the reinforcement effect may be insufficient, and insufficient dispersion tends to occur. If the amount exceeds 80 mass %, molding may become difficult, and fibers may adhere to form a mass, causing properties to be lowered. If the amount exceeds 80 mass %, the specific gravity of the reinforced resin may become too great so that the properties of the fiber-reinforced resin (specific rigidity, specific strength) may deteriorate.

(B):(C) is normally 0 to 100:100 to 0, preferably 50 to 99.8:50 to 0.2, more preferably 80 to 99:20 to 1, still more preferably 91 to 98.4:9.0 to 1.6, particularly preferably 93.0 to 98.0:7.0 to 2.0, and most preferably 94.2 to 97.0:5.8 to 3.0.

The amount of the acid-modified polyolefin-based resin (C) used in the reinforced resin of the invention is as follows. The "amount (M) of the acid-modified polyolefin-based resin per unit surface area of the glass fibers" is $0.5 \times 10^{-5}$ to $10 \times 10^{-5}$ mol/m² preferably $0.8 \times 10^{-5}$ to $6.0 \times 10^{-5}$ mol/m², still more preferably $1.2 \times 10^{-5}$ to $6 \times 10^{-5}$ mol/m², still more preferably $1.3 \times 10^{-5}$ to $\times 10^{-5}$ mol/m², particularly preferably $1.3 \times 10^{-5}$ to $4.0 \times 10^{-5}$ mol/m², and most preferably $1.4 \times 10^{-5}$ to $3.5 \times 10^{-5}$ mol/m². If "the amount (M) of the acid-modified polyolefin-based resin per unit surface area of the glass fibers" is less than $0.5 \times 10^{-5}$ mol/m², the amount of the acid-modified polyolefin-based resin may be decreased to cause fatigue strength under oscillation to be lowered. If "the amount (M) of the acid-modified polyolefin-based resin per unit surface area of the glass fibers" exceeds $10 \times 10^{-5}$ mol/m², the amount of the acid-modified polyolefin-based resin may be excessive relative to the surfaces of the glass fibers. As a result, properties such as rigidity or bending strength may be lowered due to the free acid-modified polyolefin-based resin which cannot be bonded to the glass fibers.

The ratio ((M)/(N)) of the amount (M) of the acid-modified polyolefin-based resin per unit surface area of the glass fibers to the surface density (N) of the silane coupling agent on the surfaces of the glass fibers calculated from the amount of the sizing agent adhering to the glass fibers is 0.2 to 5, preferably 0.3 to 3, more preferably 0.4 to 2, still more preferably 0.45 to 1.5, particularly preferably 0.5 to 1.2, and most preferably 0.6 to 1. If the ratio (M)/(N) is less than 0.2, fatigue strength under oscillation may be lowered due to a decrease in the amount of the acid-modified polyolefin-based resin. If the ratio (M)/(N) exceeds 5, the amount of the acid-modified polyolefin-based resin may be excessive relative to the surface of the glass fiber. As a result, the properties such as rigidity or bending strength may be lowered due to the free acid-modified polyolefin-based resin which cannot be bonded to the glass fiber.

(III-6) Method for Producing Reinforced Resin

It is preferable that the reinforced resin of the invention be a long fiber-reinforced polypropylene-based resin pellet. The method for producing the long fiber-reinforced polypropylene resin is described later.

The reinforced resin of the invention may contain various additives insofar as the effects of the invention are not impaired. Examples of such additives include various known additives such as additives for modification including dispersants, lubricants, plasticizers, flame retardants, antioxidants, anti-static agents, photo-stabilizers, UV absorbents, crystallization accelerators (nuclei-forming agents), and metal inactivators; coloring agents such as pigments or dyes; fillers in the form of powder such as carbon black, titanium oxide, talc, calcium carbonate, mica, clay, and graphite; short-fiber fillers including wallastonite, basalt fibers, and cellulose fibers; and whiskers including potassium titanate.

Various elastomers or thermoplastic polyolefins (TPO) such as an olefin-based TPO may be added to increase impact strength. An olefin-based elastomer described in JP-A-2002-3616 is preferable.

(IV) Long Fiber-Reinforced Polyolefin-Based Resin Pellets

The long fiber-reinforced polyolefin resin pellets of the invention are formed of the reinforced resin of the invention, and have a pellet length of 2 to 200 mm and a pellet diameter of 0.5 to 4.0 mm. If the pellet length is less than 2 mm, the strength of the resulting molded article may be lowered due to a decrease in fiber length. If the pellet length exceeds 200 mm, the pellets may be clogged in a hopper or the like or may be divided during molding.

The pellet length is preferably 3 to 20 mm, more preferably 4 to 12 mm, still more preferably 5 to 10 mm, and particularly preferably 6 to 9 mm. The pellet length is preferably 1.0 to 3.0 mm, more preferably 1.5 to 2.8 mm, and particularly preferably 1.8 to 2.6 mm.

(Iv-1) Method for Producing Long Fiber-Reinforced Polyolefin-Based Resin Pellets The long fiber-reinforced polyolefin-based resin pellets of the invention may be produced using a method described in Japanese Patent No. 3234877, literature ("Seikei Kakou" Vol. 5, Issue 7, page 454 (1993)), or the like, or using another known method. For example, the long fiber-reinforced polyolefin-based resin pellets may be produced by the following method.

The long fiber-reinforced resin pellets may be easily produced by introducing a bundle of 400 to 40,000 reinforced fibers (filaments) into an impregnation die to cause the filaments to be impregnated with the molten polyolefin-based resin, cooling the resulting product, and cutting the product into a required length.

For example, while the molten resin is supplied from an extruder to an impregnation die provided at the front of the extruder, a continuous glass fiber bundle is caused to pass through the impregnation die to impregnate the glass fiber bundle with the molten resin. Then, the glass fiber bundle is withdrawn through a nozzle and pelletized to a specific length. It is also possible to employ a method in which the polyolefin-based resin, modifier, organic peroxide, and the like are dry-blended and introduced into a hopper of an extruder so that modification and supply are performed simultaneously.

There are no restrictions on the impregnation method. Examples of the impregnation method include: a method in which a reinforced fiber roving is caused to pass through a polyolefin-based powder fluidized layer so that the polyolefin-based resin powder is attached to the roving, the roving is heated to a temperature higher than the melting point of the polyolefin-based resin(JP-A-46-4545); a method in which a molten polyolefin-based resin is impregnated with a reinforced fiber roving using a cross head die (JP-A-62-60625, JP-A-63-132036, JP-A-63-264326, and JP-A-1-208118); a method in which resin fibers and reinforced fiber resin rovings are mixed, and heated to a temperature higher than the melting point of the resin (JP-A-61-118235), a method in which a number of rods are arranged inside the die, a roving is wound around each rod in a zig-zag manner to open fibers to cause the roving to be impregnated with a molten resin (JP-A-10-264152); a method in which a roving is caused to pass through a pair of opened fiber pins while avoiding contact of the roving with the pin (WO 97/19805); a method in which strands of roving are formed by means of a roller (JP-A-5-169445), a method in which a mixture of a glass fiber and a polyolefin-based resin is prepared and heated (NSG Vetrotex); a method in which intake air is utilized (JP-A-9-323322); and a method in which variations of glass filament diameters are suppressed within a specific range (JP-A-2003-192911). Any of the above methods can be used.

Use of glass fibers with a specific cross-sectional shape (ellipse, cocoon-like shape, or flat) is preferable since impregnation properties are improved.

(V) Dry Blending Mixture

The dry blending mixture of the invention is obtained by dry blending the long fiber-reinforced polyolefin-based resin pellets of the invention and a thermoplastic resin.

As the thermoplastic resin used in the invention, a polyolefin-based resin, a polyolefin-based elastomer, or a polyolefin-based plastomer is preferable. A polypropylene-based resin is more preferable, with a polyolefin-based resin containing a maleic acid-modified polypropylene-based resin being particularly preferable.

The polyolefin-based resin and the maleic acid-modified polypropylene-based resin used as the thermoplastic resin may be the same as those described for the fiber-reinforced polyolefin-based resin of the invention.

The mixing ratio of the long fiber-reinforced polyolefin-based resin pellets to the thermoplastic resin in the dry blending mixture of the invention is normally 99.5:0.5 to 10:90, preferably 95:5 to 15:85, and more preferably 90:10 to 20:80.

The long fiber-reinforced polyolefin-based resin pellets and the thermoplastic resin may be dry-blended using a known apparatus such as a tumbler or a ribbon mixer. The long fiber-reinforced polyolefin-based resin pellet and the thermoplastic resin may be blended on a molding machine (table-top blending).

(VI) Method for Producing Long Fiber-Reinforced Polyolefin-Based Resin Pellets

The method for producing the long fiber-reinforced polyolefin-based resin pellets of the invention (hereinafter referred to as "production method of the invention") comprises subjecting fiber bundles to a sizing process with a sizing agent containing the modified polyolefin-based resin for glass fiber treatment of the invention, and impregnating the sizing-processed fiber bundles with an olefin-based resin component while withdrawing the continuous fiber bundles so that the composition contains 5 to 80 mass % of glass fibers.

The long fiber-reinforced polyolefin-based resin pellets produced by the production method of the invention contain 5 to 80 mass %, preferably 10 to 70 mass %, more preferably 30 to 59 mass %, and particularly preferably 35 to 55 mass % of glass fibers. If the amount of glass fibers is less than 5 mass %, rigidity may be insufficient. Moreover, properties may vary. If the amount exceeds 80 mass %, fluidity may be lowered, resulting in difficulty in molding.

The production method of the invention is described below in more detail.

Molten glass is formed into fibers by passing the molten glass through a busing or the like. A sizing agent containing the glass fiber treatment polyolefin-based resin of the invention and a silane coupling agent is applied to the resulting fibers to bind the fibers to form a fiber bundle (formed of normally 400 to 10,000 fibers (filaments) of the invention).

The fiber bundle is dried to form surface-treated glass fibers. Drying may be performed after rolling the fibers into a roving, a cake, or the like, or immediately after forming the bundle. The drying condition is normally 60 to 180° C., preferably 80 to 160° C., more preferably 100 to 140° C., and particularly preferably 110 to 130° C. If the temperature is within the above range, bonding of the coupling agent is conducted smoothly, whereby a sufficient interfacial strength may readily be provided.

The bundle of the surface-treated glass fibers is introduced into an impregnation die (impregnation box) to allow the filaments to be impregnated with the molten polyolefin-based resin. The polyolefin-based resin may or may not contain an acid-modified polyolefin-based resin. The polyolefin-based resin preferably contains an acid-modified polyolefin-based resin in an amount of 0.2 to 50 mass %, more preferably 1 to 20 mass %, still more preferably 1.6 to 9.0 mass %, particularly preferably 2.0 to 7.0 mass %, and most preferably 3.0 to 5.8 mass %. If the acid-modified polyolefin-based resin is contained in an amount of 50 mass % or more, the resin may adhere to a metallic part such as the impregnation die, causing the fiber bundle to be cut readily.

The residence time of the resin in the impregnation die (=die volume/amount of resin flowing in) may be appropriately selected. The residence time is normally 0.5 to 120 minutes, preferably 0.5 to 60 minutes, still more preferably 1 to 30 minutes, even more preferably 1.5 to 20 minutes, and particularly preferably 2 to 15 minutes. If the residence time is less than 0.5 minutes, impregnation with the resin may be insufficient to cause insufficient dispersion in a molded article. As a result, the fatigue strength under oscillation of a molded article may be lowered. If the residence time is longer than 120 minutes, the resin may deteriorate.

The time that the fiber bundle passes through the impregnation die may be appropriately selected, however, preferably 0.3 to 30 seconds, more preferably 0.5 to 15 seconds, still more preferably 1.0 to 10 seconds, and particularly preferably 1.5 to 6 seconds. If the above time is shorter than 0.3 seconds, impregnation with the resin may be insufficient, thus causing insufficient dispersion in a molded article. As a result, the fatigue strength under oscillation of a molded article may be lowered. If the above time is 30 seconds or more, the treated surfaces of the glass fibers may deteriorate, or the residence time of the resin may be increased, whereby the fatigue strength under oscillation of the resulting molded article may be decreased.

The amount of volatile low-molecular-weight polar components may be decreased by degassing in the same manner as in the method of removing components soluble in boiling MEK described for the glass fiber treatment polyolefin-based resin of the invention. When degassing is conducted when producing the long fiber-reinforced polyolefin-based resin, it is preferable that an opening be provided in the impregnation die (impregnation box) to volatize low-molecular-weight components while allowing the resin to be retained in the impregnation die (impregnation box) for a period of time equal to or longer than a predetermined period of time. The total area of the opening(s) is normally 1 cm$^2$ or more, preferably 4 cm$^2$ or more, more preferably 12 cm$^2$ or more, still more preferably 36 cm$^2$ or more, and particularly preferably 100 cm$^2$ or more. The average residence time of the resin is normally 3 to 120 minutes, preferably 6 to 90 minutes, more preferably 8 to 60 minutes, still more preferably 9 to 45 minutes, and particularly preferably 10 to 30 minutes. If the average residence time is shorter than 3 minutes, degassing may be insufficient. If the average residence time is longer than 120 minutes, the resin may deteriorate.

The opening may also be used as the port for introducing the fibers.

The opening may have a direct contact with air or an inert gas (nitrogen or the like), or may be vacuum (reduced pressure) purged. In order to suppress deterioration of the resin, it is preferable that the opening contact an inert gas or be vacuum (reduced pressure) purged. It is more preferable to vacuum (reduced pressure) purge the opening from the viewpoint of degassing efficiency.

When introducing the molten resin into the impregnation die (impregnation box) using an extruder, it is preferable to use an extruder provided with a vent.

The fiber bundle impregnated with the polyolefin-based resin is withdrawn from the impregnation die (impregnation box), cooled to solidify, and cut into a desired length to obtain the long fiber-reinforced polyolefin resin pellets.

(VII) Molded Article

The molded article of the invention is obtained by molding the fiber-reinforced polyolefin-based resin, the long fiber-reinforced polyolefin-based resin pellets, or the dry blending mixture of the invention.

The average residual glass fiber length in the molded article of the invention is normally 0.4 mm or more, preferably 0.8 mm or more, more preferably 1.2 mm, still more preferably 1.6 mm or more, and particularly preferably 1.8 mm or more. If the average residual glass fiber length in the molded article is less than 0.4 mm, the strength of the molded article may be lowered.

The amounts of toluene, xylene, and acetaldehyde generated from the molded article are normally 300 µg/m$^3$ or less, preferably 100 µg/m$^3$ or less, more preferably 50 µg/m$^3$ or less, still more preferably 40 µg/m$^3$ or less, particularly preferably 30 µg/m$^3$, and most preferably 20 µg/m$^3$ or less. If the amount exceeds 300 µg/m$^3$, an unfavorable odor may be generated.

(VII-1) Molding Method for Molded Article

The method of molding the molded article of the invention is not particularly limited. A known method may be used.

As the molding method, a known method such as injection molding, injection compression molding, compression molding, gas-assisted injection molding, foam injection molding, expansion molding, extrusion molding, or hollow molding may be used without specific limitations. Of these, a molding method using an injection molding machine is preferable from the viewpoint of productivity and stable quality.

It is also possible to obtain a molded article from a mat (glass mat sheet) or a prepreg prepared using the surface-treated glass fibers of the invention, or to obtain a molded article using injection compounding such as in-line compounding and direct compounding described in "Plastics Info World 11/2002, pages 20 to 35".

In view of productivity and stable quality, it is preferable that a molded article be obtained from resin pellets, in particular, long fiber-reinforced resin pellets or a blend thereof.

(VII-2) Properties of Molded Article (1) Fatigue Strength Under Oscillation

Figure 2:
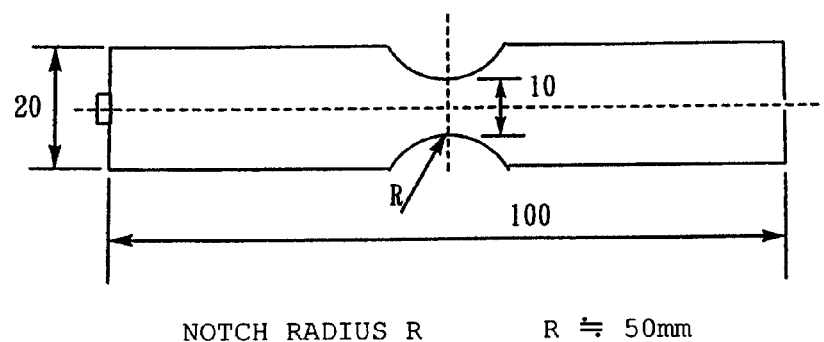
FIG. 2 is a view showing the shape of a specimen for measuring fatigue strength under oscillation used in the examples and comparative examples.

A specimen (molded article) having a shape shown in FIG. 2 is prepared under molding conditions of a resin temperature of 240° C. and a mold temperature of 40° C. The specimen is subjected to oscillation fatigue tension (one-way oscillation mode) under specific conditions, and the number of oscillations until the specimen breaks is counted.

(2) Tensile Stress at Break

Measured according to JIS K 7161-1994.

(3) Amounts of Toluene, Xylene, and Formaldehyde Generated

The amounts of toluene, xylene, and formaldehyde generated are determined by subjecting a gas generated by heating to gas chromatography (GC). The measuring conditions using gas chromatography are as follows.

Transfer line temperature: 300° C.
TDS thermal extraction temperature: 80° C. (30 minutes)
Column: HP-SMS
Carrier gas: He, 31 cm/sec
Detector (FID) temperature: 330° C.

EXAMPLES

The invention is described below in more detail by way of examples and comparative examples. Note that the invention is not limited to the following examples.

Production Example 1

Acid-Modified Polypropylene-Based Resin for Glass Fiber Treatment (1) Production of Maleic Acid-Modified Polypropylene (EM)
(1-1) Modification Method-1: Melting Method (EM-1 to EM-9, EM-11, and EM-12)

As shown in Table 2, polypropylene, maleic acid, and an organic peroxide were put in a twin-screw extruder provided with a vent. The resulting mixture was subjected to melt kneading under predetermined conditions to produce maleic acid-modified polypropylene.

Components extractable with boiling methyl ethyl ketone contained in the resulting maleic acid-modified polypropylene were removed by the following purification method or washing method.

(1-2) Purification Method (EM-1 to EM-8)

The maleic acid-modified polypropylene obtained above was heated (around 130° C.) in paraxylene with stirring to completely dissolve the resin. The resulting solution was added to methyl ethyl ketone to effect reprecipitatation. After filtration, the product was vacuum-dried (at 130° C. for six hours)

(1-3) Washing Method (EM-9 and EM-11)

1 kg of the maleic acid-modified propylene obtained above was washed at 85° C. for two hours in a mixed solution of acetone (3 l) and heptane (3 l) in a 10 l-capacity autoclave. After washing, the liquid was removed and allowed to stand for 12 hours in 10 l of acetone. After removing the liquid, the resulting product was vacuum-dried at 130° C. for six hours.

(1-4) Solution Method (EM-10)

For EM-10, 100 phr of a polypropylene homopolymer (J-700G; manufactured by Idemitsu Kosan, Co., Ltd., MFR=7 g/10 min), 2 phr of polybutadiene (polybd R-45HT, manufactured by Idemitsu Kosan Co., Ltd.), 10 phr of maleic anhydride (manufactured by Nippon Shokubai Co., Ltd.), and 0.4 phr of di-t-butylperoxide (Perbutyl D, organic peroxide manufactured by Kayaku Akzo Corp.) were put in a 4 l-capacity autoclave (toluene). The resulting mixture was heated to 145° C. to allow the mixture to react. After cooling, the resin extracted with 2 l of methyl ethyl ketone was separated by centrifugation. After washing the resin by spraying ethyl ethyl ketone at room temperature onto the resin, the resin was vacuum-dried at 60° C. for 24 hours.

(1-5) Components Extractable with Boiling Methyl Ethyl Ketone were not Removed for Em-12.

(1-6) Umex 1010 (Manufactured by Sanyo Chemical Industries), a Commercially Available Product of Maleic Acid-Modified Polypropylene, was Directly Used as Em-13.

(2) Evaluation of Properties of Maleic Acid-Modified Polypropylene

The following properties were measured for EM-1 to EM-13. The results are shown in Table 3.

(2-1) Number Average Molecular Weight (Mn)

The number average molecular weight (Mn) was determined according to the method described in JP-A-11-71431 from the polystyrene-reduced molecular weight distribution curve by gel permeation chromatography (GPC). The measuring conditions are as follows.
Calibration curve: Universal Calibration
Column: TOSOH GMHHR-H(S) HT×2
Solvent: 1,2,4-trichlorobenzene
Temperature: 145° C.
Flow rate: 1.0 ml/min
Detector: RI (Waters Alliance GPC 2000)
Analysis program: HTGPC (v 1.00)

(2-2) Amount of Components Extractable with Boiling Methyl Ethyl Ketone (MEK)

The EM samples obtained above were pulverized using a mortar and extracted with boiling methyl ethyl ketone for six hours using a Soxhlet extractor, and the mass of the extract was measured.

"(mass of extract)/(original mass of sample)" (mass %) was defined as the amount of components extractable with boiling methyl ethyl ketone.

(2-3) Total Amount (a) of Maleic Acid Added

The relational expression between the peak area and the amount of maleic acid was calculated using dodecylsuccinic anhydride and concentration adjustment polypropylene powder (H-700 manufactured by Idemitsu Kosan Co., Ltd) to obtain a calibration curve.

The EM samples were pre-heated at 230° C. for 10 minutes by hot pressing, pressed for four minutes (5 MPa), and cold-pressed for three minutes (5 MPa) to obtain films with a thickness of about 0.1 mm.

The FT-IR transmission spectrum of each film was measured within two hours after preparation of the film, and the peak area of the FT-IR spectrum at 1670 to 1810 $cm^{-1}$ was calculated and compared with the above calibration curve to determine the total amount (a) of maleic acid added.

(2-4) Amount (b) of Maleic Acid Added (Components Insoluble in Methyl Ethyl Ketone)

The relational expression between the peak area and the amount of maleic acid was calculated using dodecylsuccinic anhydride and concentration adjustment polypropylene powder (H-700 manufactured by Idemitsu Kosan Co., Ltd) to obtain a calibration curve.

The EM samples were pre-heated at 230° C. for 10 minutes by hot pressing, pressed for four minutes (5 MPa), and cold-pressed for three minutes (5 MPa) to obtain films with a thickness of about 0.1 mm.

A part of the above film was washed with methyl ethyl ketone (MEK) at 70° C. for three hours and vacuum-dried at 110° C. for two hours.

The FT-IR transmission spectrum of each film was measured within two hours after drying, and the peak area of the FT-IR spectrum at 1670 to 1810 $cm^{-1}$ was calculated and compared with the above calibration curve to determine the "amount (b) of maleic acid added (components insoluble in MEK)".

(2-5) Amount of Low-Molecular-Weight Carboxylic Acid Group-Containing Components (a)-(b) (=Change in Amount of Acid Added Before and after Treatment in MEK at 70° C. for Three Hours)

The amount (b) of maleic acid added determined in (2-4) was subtracted from the total amount (a) of maleic acid added determined in (2-3) to determine the "amount of low-molecular-weight carboxylic acid group-containing components (=change in amount of acid added before and after treatment in MEK at 70° C. for three hours)".

(2-6) Limiting Viscosity (η)

The limiting viscosity was measured at 135° C. in decalin.

(2-7) Amount of Components with Molecular Weight of Less than 10,000 (Mass %)

The amount of components with a molecular weight of less than 10,000 was determined according to the method described in JP-A-11-71431 from the polystyrene-reduced molecular weight distribution curve by gel permeation chromatography (GPC).

The measuring conditions are as follows.
Calibration curve: Universal Calibration
Column: TOSOH GMHHR-H(S) HT×2
Solvent: 1,2,4-trichlorobenzene
Temperature: 145° C.
Flow rate: 1.0 ml/min (2-8) Number of Maleic Acid Groups Per Molecule The number of functional groups per molecule is calculated by the formula "number of functional groups per molecule=$(0.01 \times A \div Mr) \div (1 \div Mn) = 0.01 \times A \times Mn/Mr \approx A \times Mn/10,000$". In the formula, A is the amount of functional groups (maleic acid groups) added (mass %), Mr is the molecular weight of the functional group (maleic acid group: Mr=98), and Mn is the number average molecular weight of the acid-modified polypropylene-based resin.

(2-9) Amounts of Volatile Organic Products Generated (ppm)

The amounts of toluene and xylene generated were determined by subjecting a gas generated by heating to gas chromatography (GC). The measuring conditions are as follows.
Transfer line temperature: 300° C.
TDS thermal extraction temperature: 80° C. (30 minutes)
Column: HP-SMS
Carrier gas: He, 31 cm/sec
Detector (FID) temperature: 330° C.

TABLE 2

Method for producing maleic acid-modified polypropylene and method for removing components extractable with boiling MEK

| | Method of modification | Method for removing components extractable with boiling MEK | Kneading condition Revolution (rpm) | Kneading condition Cylinder temperature (° C.) | Top-feeding (parts by mass) Polypropylene | Top-feeding (parts by mass) Maleic acid | Top-feeding (parts by mass) Organic peroxide | | Side-feeding (parts by mass) Polypropylene | Side-feeding (parts by mass) Maleic acid | Charging ratio Top/Side | Remarks |
|---|---|---|---|---|---|---|---|---|---|---|---|---|
| EM-1 | Melting method | Purification | 100 | 170 | A 100 | 4 | C | 3 | | | 1/0 | |
| EM-2 | Melting method | Purification | 300 | 180 | A 100 | 13 | D | 13 | B 100 | 9 | 1/1 | |
| EM-3 | Melting method | Purification | 100 | 180 | A 100 | 3.5 | E | 0.5 | | | 1/0 | |
| EM-4 | Melting method | Purification | 100 | 180 | A 100 | 4 | E | 1 | | | 1/0 | |
| EM-5 | Melting method | Purification | 450 | 240 | A 100 | 6 | C | 4 | | | 1/0 | |
| EM-6 | Melting method | Purification | 300 | 180 | A 100 | 6 | C | 2.5 | | | 1/0 | |
| EM-7 | Melting method | Purification | 100 | 180 | A 100 | 3 | C | 3 | | | 1/0 | |
| EM-8 | Melting method | Purification | 450 | 220 | B 100 | 6 | C | 4 | | | 1/0 | |
| EM-9 | Melting method | Washing | 100 | 170 | A 100 | 4 | C | 3 | | | 1/0 | |
| EM-10 | Melting method | (Washing) | — | — | — | — | — | — | — | — | — | Described in specification |
| EM-11 | Melting method | washing | 100 | 170 | A 100 | 4 | C | 3 | | | 1/0 | |
| EM-12 | Melting method | — | 300 | 240 | A 100 | 6 | C | 3 | | | 1/0 | |
| EM-13 | Commercial product | — | — | — | — | — | — | — | — | — | — | Commercial product |

The polypropylene and the organic peroxide shown in Table 2 are as follows.

Polypropylene:

A: H-100M manufactured by Idemitsu Kosan Co., Ltd, MFR 0.5 g/10 min

B: H-700 manufactured by Idemitsu Kosan Co., Ltd, MFR=8 g/10 min

Organic Peroxide:

C: PC14/40C manufactured by Kayaku Akzo Corporation

D: AD-2 manufactured by Kayaku Akzo Corporation

E: Perkadox 14 manufactured by Kayaku Akzo Corporation

TABLE 3

Properties of maleic acid-modified polypropylene for glass fiber treatment

| Properties | Unit etc. | EM-1 | EM-2 | EM-3 | EM-4 | EM-5 | EM-6 | EM-7 |
|---|---|---|---|---|---|---|---|---|
| Number average molecular weight (Mn) | — | 21000 | 21000 | 21000 | 26000 | 13000 | 36000 | 21000 |
| Amount of components extractable with boiling MEK | Mass % | <0.1 | <0.1 | <0.1 | <0.1 | <0.1 | <0.1 | <0.1 |
| Total amount (a) of acid added | 1810 to 1670 cm$^{-1}$ | 1.2 | 2.4 | 0.9 | 1.2 | 2.1 | 1.0 | 0.7 |
| Amount (b) of acid added (insoluble in MEK) | 1810 to 1670 cm$^{-1}$ | 1.2 | 2.4 | 0.9 | 1.2 | 2.1 | 1.0 | 0.7 |
| Amount of low-molecular-weight carboxylic acid group-containing components (a) − (b) | 1810 to 1670 cm$^{-1}$ | 0.0 | 0.0 | 0.0 | 0.0 | 0.0 | 0.0 | 0.0 |
| Limiting viscosity (η) | — | 0.52 | 0.95 | 0.52 | 0.56 | 0.35 | 0.78 | 0.52 |
| Amount of components with molecular weight of less than 10,000 | mass % | 8 | 8 | 8 | 7 | 13 | 5 | 10 |
| Number of maleic acid groups per molecule | — | 2.5 | 5.0 | 1.9 | 3.1 | 2.7 | 3.6 | 1.5 |
| Amount of volatile organic product generated — Toluene | ppm | <30 | <30 | <30 | <30 | <30 | <30 | <30 |
| Amount of volatile organic product generated — Xylene | ppm | <30 | <30 | <30 | <30 | <30 | <30 | <30 |

| Properties | Unit etc. | EM-8 | EM-9 | EM-10 | EM-11 | EM-12 | EM-13 |
|---|---|---|---|---|---|---|---|
| Number average molecular weight (Mn) | — | 9500 | 21000 | 28000 | 21000 | 21000 | 5100 |
| Amount of components extractable with boiling MEK | Mass % | <0.1 | 1.2 | 2.8 | 5.5 | 10 | 18 |
| Total amount (a) of acid added | 1810 to 1670 cm$^{-1}$ | 2.3 | 1.5 | 3.4 | 1.9 | 2.4 | 5.5 |
| Amount (b) of acid added (insoluble in MEK) | 1810 to 1670 cm$^{-1}$ | 2.3 | 1.2 | 2.9 | 1.2 | 1.2 | 3.5 |
| Amount of low-molecular-weight carboxylic acid group-containing components (a) − (b) | 1810 to 1670 cm$^{-1}$ | 0.0 | 0.3 | 0.5 | 0.7 | 1.2 | 2.0 |
| Limiting viscosity (η) | — | 0.24 | 0.50 | 0.56 | 0.39 | 0.52 | 0.19 |
| Amount of components with molecular weight of less than 10,000 | mass % | 18 | 9 | 10 | 9 | 12 | 45 |
| Number of maleic acid groups per molecule | — | 2.1 | 2.5 | 5.3 | 2.5 | 2.5 | 1.8 |
| Amount of volatile organic product generated — Toluene | ppm | <30 | <30 | 600 | <30 | <30 | <30 |
| Amount of volatile organic product generated — Xylene | ppm | <30 | <30 | <30 | <30 | <30 | 800 |

In Table 3, EM-1 to EM-11 correspond to the acid-modified polyolefin-based resin for glass fiber treatment of the invention.

Production Example 2

Production of Surface-Treated Glass Fiber (GFEM)

E-glass fibers (specific gravity: 2.55 g/cm$^3$) with a diameter of 17 μm were treated with a sizing agent containing the maleic acid-modified polypropylene for glass fiber treatment obtained in Production Example 1 and a silane coupling agent, and dried by heating to obtain a roving.

TABLE 4

Production of surface-treated glass fiber

| | Sizing agent | | | Amount of |
| | Silane coupling agent (CP) | Surface treatment resin (EM) | Ratio EM/CP | EM adhering to treated glass fibers (mass %) |
|---|---|---|---|---|
| GFEM-1 | CP-1 | EM-1 | 6 | 0.40 |
| GFEM-2 | CP-1 | EM-1 | 6 | 0.40 |
| GFEM-3 | CP-2 | EM-1 | 6 | 0.40 |
| GFEM-4 | CP-1 | EM-2 | 6 | 0.40 |
| GFEM-5 | CP-1 | EM-3 | 6 | 0.40 |
| GFEM-6 | CP-1 | EM-4 | 6 | 0.40 |
| GFEM-7 | CP-1 | EM-5 | 6 | 0.40 |
| GFEM-8 | CP-1 | EM-1 | 6 | 0.40 |
| GFEM-9 | CP-1 | EM-1 | 6 | 0.40 |
| GFEM-10 | CP-1 | EM-1 | 6 | 0.40 |
| GFEM-11 | CP-1 | EM-1 | 6 | 0.40 |
| GFEM-12 | CP-1 | EM-1 | 6 | 0.40 |
| GFEM-13 | CP-1 | EM-1 | 6 | 0.35 |
| GFEM-14 | CP-1 | EM-1 | 6 | 0.30 |
| GFEM-15 | CP-1 | EM-1 | 8 | 0.40 |
| GFEM-16 | CP-1 | EM-6 | 6 | 0.40 |
| GFEM-17 | CP-1 | EM-7 | 6 | 0.40 |
| GFEM-18 | CP-1 | EM-8 | 6 | 0.40 |
| GFEM-19 | CP-1 | EM-9 | 6 | 0.40 |
| GFEM-20 | CP-1 | EM-10 | 6 | 0.40 |
| GFEM-21 | CP-1 | EM-11 | 6 | 0.40 |
| GFEM-26 | CP-1 | EM-12 | 6 | 0.40 |
| GFEM-27 | CP-1 | EM-13 | 6 | 0.40 |
| GFEM-28 | CP-1 | EM-13 | 6 | 0.40 |
| GFEM-29 | CP-1 | EM-1 | 6 | 0.40 |

The surface-treated glass fibers shown in Table 4 correspond to the surface-treated glass fibers of the invention, except for GFEM-26 to 28.

The silane coupling agent shown in Table 4 is as follows.
CP-1: 3-aminopropyltriethoxysilane (KBE-903 manufactured by Shin-Etsu Chemical Co., Ltd, molecular weight: 221.4, minimum coating area: 353 m$^2$/g)
CP-2: N-2-(aminoethyl)-3-aminopropyltrimethoxysilane (KBM-603 manufactured by Shin-Etsu Chemical Co., Ltd, molecular weight: 222.4, minimum coating area: 351 m$^2$/g)

Production Example 3

Production of Long Fiber-Reinforced Polypropylene-Based Resin Pellets (GFMB)

As shown in Table 5, long fiber-reinforced polypropylene-based resin pellets with a pellet length of 8 mm and an average pellet diameter (diameter) of 2.1 mm were produced using the surface-treated glass fibers prepared in Production Example 2 using a production apparatus shown in FIG. 1 under the following conditions.

<Production Conditions>
Withdrawing rate: 25 m/min
Preheating temperature: 200° C.
Resin temperature: 260° C.
Cooling temperature: 35° C.
Die diameter: 2.3

TABLE 5

Production of long fiber-reinforced polypropylene-based resin pellets

| | Mixing ratio (mass %) | | | | | |
| | Surface-treated glass fiber | | Polypropylene | | Modified polypropylene | |
|---|---|---|---|---|---|---|
| GFMB-1 | GFEM-1 | 50 | PP-1 | 47 | MPP-1 | 3 |
| GFMB-2 | GFEM-2 | 50 | PP-2 | 47 | MPP-1 | 3 |
| GFMB-3 | GFEM-3 | 50 | PP-2 | 47 | MPP-1 | 3 |
| GFMB-4 | GFEM-4 | 50 | PP-1 | 47 | MPP-1 | 3 |
| GFMB-5 | GFEM-5 | 50 | PP-1 | 47 | MPP-1 | 3 |
| GFMB-6 | GFEM-6 | 50 | PP-1 | 47 | MPP-1 | 3 |
| GFMB-7 | GFEM-7 | 50 | PP-1 | 47 | MPP-1 | 3 |
| GFMB-8 | GFEM-8 | 50 | PP-1 | 48 | MPP-1 | 2 |
| GFMB-9 | GFEM-9 | 50 | PP-1 | 47 | MPP-2 | 3 |
| GFMB-10 | GFEM-10 | 50 | PP-1 | 47 | MPP-3 | 3 |
| GFMB-11 | GFEM-11 | 50 | PP-1 | 47 | MPP-4 | 3 |
| GFMB-12 | GFEM-12 | 50 | PP-1 | 47 | MPP-5 | 3 |
| GFMB-13 | GFEM-13 | 50 | PP-1 | 47 | MPP-1 | 3 |
| GFMB-14 | GFEM-14 | 50 | PP-1 | 47 | MPP-1 | 3 |
| GFMB-15 | GFEM-15 | 50 | PP-1 | 47 | MPP-1 | 3 |
| GFMB-16 | GFEM-16 | 50 | PP-1 | 47 | MPP-1 | 3 |
| GFMB-17 | GFEM-17 | 50 | PP-1 | 47 | MPP-1 | 3 |
| GFMB-18 | GFEM-18 | 50 | PP-1 | 47 | MPP-1 | 3 |
| GFMB-19 | GFEM-19 | 50 | PP-1 | 47 | MPP-1 | 3 |
| GFMB-20 | GFEM-20 | 50 | PP-1 | 47 | MPP-1 | 3 |
| GFMB-21 | GFEM-21 | 50 | PP-1 | 47 | MPP-1 | 3 |
| GFMB-26 | GFEM-26 | 50 | PP-1 | 47 | MPP-1 | 3 |
| GFMB-27 | GFEM-27 | 50 | PP-1 | 47 | MPP-1 | 3 |
| GFMB-28 | GFEM-28 | 50 | PP-1 | 47 | MPP-6 | 3 |
| GFMB-29 | GFEM-29 | 50 | PP-1 | 50 | MPP-1 | 0 |

The long fiber-reinforced polyolefin-based resin pellets shown in Table 5 correspond to the long fiber-reinforced polyolefin-based resin pellets of the invention, except for GFMB-26 to GFMB-28.

The polypropylene and the modified polypropylene shown in Table 5 are as follows.

Polypropylene:

PP-1: prepared by melt kneading J-3000GV (manufactured by Idemitsu Kosan Co., Ltd.) (100%) and Perkadox 14 (organic peroxide) (manufactured by Kayaku Akzo Corporation) (0.02%) at 200° C. using a twin-screw extruder; MFR=120

PP-2: prepared by melt kneading H-50000 (manufactured by Idemitsu Kosan Co., Ltd., MFR=500) (50%) and J-3000GV (50%) at 200° C. using a twin-screw extruder; MFR=120

Modified Polypropylene:

The method for producing the maleic acid-modified polypropylene-based resin (MPP) used to produce the long fiber-reinforced polypropylene-based resin pellets is shown in Table 6. The details of the method for producing the maleic acid-modified polypropylene-based resin and the method for removing components extractable with boiling methyl ethyl ketone are the same as described in Production Example 1. The properties of the maleic acid-modified polypropylene-based resin (MPP) are shown in Table 7. The methods for measuring the properties are the same as described in Production Example 1 (2).

TABLE 6

Production of modified polypropylene used for long fiber-reinforced polypropylene-based resin pellets

| | Modification method | Method of removing components extractable with boiling MEK | Kneading conditions | | Top-feeding (parts by mass) | | | Side-feeding (parts by mass) | | Charging ratio Top/Side | Remarks |
|---|---|---|---|---|---|---|---|---|---|---|---|
| | | | Revolution (rpm) | Temperature (°C.) | Polypropylene | Maleic acid | Organic peroxide | Polypropylene | Maleic acid | | |
| MPP-1 | Melting method | Purification | 300 | 170 | A 100 | 2 | E 0.4 | | | 1/0 | |
| MPP-2 | Melting method | Washing × 3 | 300 | 170 | A 100 | 2 | E 0.4 | | | 1/0 | |
| MPP-3 | Melting method | Washing | 300 | 170 | A 100 | 2 | E 0.4 | | | 1/0 | |
| MPP-4 | Melting method | Washing | 450 | 230 | A 100 | 4.5 | D 2 | B 100 | 0 | 1/1 | |
| MPP-5 | Melting method | — | 300 | 170 | A 100 | 2 | E 0.4 | | | 1/0 | |
| MPP-6 | Melting method | — | 100 | 180 | A 100 | 4 | C 1 | | | 1/0 | |

The polypropylene and the organic peroxide shown in Table 6 are as follows.

Polypropylene:

A: H-100M manufactured by Idemitsu Kosan Co., Ltd., MFR=0.5 g/10 min

B: H-700 manufactured by Idemitsu Kosan Co., Ltd., MFR=8 g/10 min

Organic Peroxide:

C: PC14/40C manufactured by Kayaku Akzo Corporation

D: AD-2 manufactured by Kayaku Akzo Corporation

E: Perkadox 14 manufactured by Kayaku Akzo Corporation

TABLE 7

Properties of maleic acid-modified polypropylene (MPP)

| Properties | Unit etc. | MPP-1 | MPP-2 | MPP-3 | MPP-4 | MPP-5 | MPP-6 |
|---|---|---|---|---|---|---|---|
| Number average molecular weight (Mn) | — | 36000 | 36000 | 36000 | 30000 | 36000 | 36000 |
| Amount of components extractable with boiling MEK | mass % | <0.1 | 0.2 | 1.2 | 2.1 | 3.5 | 4.8 |
| Total amount (a) of acid added | 1810 to 1670 cm$^{-1}$ | 0.8 | 0.9 | 1.1 | 1.0 | 1.3 | 1.7 |
| Amount (b) of acid added (components insoluble in MEK) | 1810 to 1670 cm$^{-1}$ | 0.8 | 0.8 | 0.8 | 0.7 | 0.8 | 0.8 |
| Amount of low-molecular-weight carboxylic acid group-containing components (a) − (b) | 1810 to 1670 cm$^{-1}$ | 0.0 | 0.1 | 0.3 | 0.3 | 0.5 | 0.9 |
| Limiting viscosity(η) | — | 0.78 | 0.77 | 0.76 | 1.13 | 0.61 | 0.78 |
| Amount of components with molecular weight of less than 10,000 | mass % | 5 | 5 | 5 | 7 | 5 | 5 |
| Number of maleic acid groups per molecule | — | 2.9 | 2.9 | 2.9 | 2.1 | 2.9 | 2.9 |
| Amount of organic volatile product generated | Toluene ppm | <30 | <30 | <30 | <30 | <30 | <30 |
| | Xylene ppm | <30 | <30 | <30 | <30 | <30 | <30 |

Examples 1 to 27 and Comparative Examples 1 to 3

Molded article samples were prepared under the following conditions using the long fiber-reinforced resin pellets (GFMB) produced in Production Example 3 at mixing ratios shown in Table 8. The properties of the molded articles were evaluated. The results are shown in Table 8.

<Method for Measuring Properties of Molded Article>

(1) Fatigue Strength Under Oscillation (Times)

A specimen (molded article) having a shape (injection dumbbell, R=50) shown in FIG. 2 was prepared under molding conditions of a resin temperature of 240° C. and a mold temperature of 40° C. The specimen was subjected to oscillation fatigue tension (one-way oscillation mode) using the following apparatus under the conditions given below, and the number of oscillations until the specimen broken was counted.

<Apparatus Used and Measuring Conditions>

Apparatus used: Shimadzu Servo Pulser EHF-ED10KN-10L (manufactured by Shimadzu Corporation)

Distance between chucks: 60 mm

Temperature: 23° C.

Frequency: 10 Hz

Maximum stress (=stress amplitude×2): 80 MPa (2) Tensile Stress at Break:
Measured according to JIS K 7161-1994.

(3) Amounts of Toluene, Xylene, and Acetoaldehyde Generated ($\mu g/m^3$)
Measured according to a small chamber method (JIS A1901: 2003).

TABLE 8

Properties of molded article

| | Amount (mass %) | | | | Glass fiber concentration (mass %) | Properties of molded article | | | | Generated amounts of acetoaldehyde ($\mu g/m^3$) |
|---|---|---|---|---|---|---|---|---|---|---|
| | Long fiber reinforced resin pellet | | Diluting resin | M-MB | | Fatigue strength under oscillation (70 MPa, 10 Hz) (times) | Tensile stress at break (MPa) | Generated amounts of toluene ($\mu g/m^3$) | Generated amounts of xylene ($\mu g/m^3$) | |
| Example 1 | GFMB-1 | 80 | PP-3 | 20 | 0 | 40 | 12000 | 169 | <20 | <20 | 50 |
| Example 2 | GFMB-2 | 80 | PP-3 | 20 | 0 | 40 | 13000 | 171 | <20 | <20 | <10 |
| Example 3 | GFMB-3 | 80 | PP-3 | 20 | 0 | 40 | 14000 | 172 | <20 | <20 | <10 |
| Example 4 | GFMB-4 | 80 | PP-3 | 20 | 0 | 40 | 9800 | 164 | <20 | <20 | — |
| Example 5 | GFMB-5 | 80 | PP-3 | 20 | 0 | 40 | 11500 | 168 | <20 | <20 | — |
| Example 6 | GFMB-6 | 80 | PP-3 | 20 | 0 | 40 | 11100 | 168 | <20 | <20 | — |
| Example 7 | GFMB-7 | 80 | PP-3 | 20 | 0 | 40 | 10100 | 165 | <20 | <20 | — |
| Example 8 | GFMB-8 | 80 | PP-3 | 20 | 0 | 40 | 11000 | 167 | <20 | <20 | — |
| Example 8 | GFMB-9 | 80 | PP-3 | 20 | 0 | 40 | 10200 | 166 | <20 | <20 | — |
| Example 10 | GFMB-10 | 80 | PP-3 | 20 | 0 | 40 | 9600 | 164 | <20 | <20 | — |
| Example 11 | GFMB-11 | 80 | PP-3 | 20 | 0 | 40 | 8800 | 163 | <20 | <20 | — |
| Example 12 | GFMB-12 | 80 | PP-3 | 20 | 0 | 40 | 8100 | 163 | <20 | <20 | — |
| Example 13 | GFMB-13 | 80 | PP-3 | 20 | 0 | 40 | 10500 | 166 | <20 | <20 | — |
| Example 14 | GFMB-14 | 80 | PP-3 | 20 | 0 | 40 | 9100 | 163 | <20 | <20 | — |
| Example 15 | GFMB-15 | 80 | PP-3 | 20 | 0 | 40 | 9100 | 163 | <20 | <20 | — |
| Example 16 | GFMB-16 | 80 | PP-3 | 20 | 0 | 40 | 8200 | 163 | <20 | <20 | — |
| Example 17 | GFMB-17 | 80 | PP-3 | 20 | 0 | 40 | 10100 | 165 | <20 | <20 | — |
| Example 18 | GFMB-18 | 80 | PP-3 | 20 | 0 | 40 | 8100 | 162 | <20 | <20 | — |
| Example 19 | GFMB-19 | 80 | PP-3 | 20 | 0 | 40 | 9400 | 164 | <20 | <20 | — |
| Example 20 | GFMB-20 | 80 | PP-3 | 20 | 0 | 40 | 7800 | 161 | <20 | <20 | — |
| Example 21 | GFMB-21 | 80 | PP-3 | 20 | 0 | 40 | 6100 | 151 | <20 | <20 | — |
| Example 22 | GFMB-29 | 80 | PP-3 | 0 | 20 | 40 | 12500 | 170 | <20 | <20 | — |
| Example 23 | GFMB-29 | 80 | PP-3 | 5 | 15 | 40 | 12500 | 170 | <20 | <20 | — |
| Example 24 | GFMB-29 | 80 | PP-3 | 10 | 10 | 40 | 12000 | 169 | <20 | <20 | — |
| Example 25 | GFMB-1 | 80 | PP-3 | 10 | 10 | 40 | 11500 | 168 | <20 | <20 | — |
| Example 26 | GFMB-1 | 80 | PP-4 | 20 | 0 | 40 | 7000 | 155 | <20 | <20 | — |
| Example 27 | GFMB-1 | 60 | PP-3 | 40 | 0 | 30 | 6500 | 145 | <20 | <20 | — |
| Comparative Example 1 | GFMB-26 | 80 | PP-3 | 20 | 0 | 40 | 2400 | 138 | <20 | <20 | 80 |
| Comparative Example 2 | GFMB-27 | 80 | PP-3 | 20 | 0 | 40 | 1900 | 132 | <20 | 200 | 90 |
| Comparative Example 3 | GFMB-28 | 80 | PP-3 | 20 | 0 | 40 | 1200 | 128 | <20 | 200 | 100 |

The symbols in Table 8 have the following meanings.
Diluting resin:
PP-3: J-3000GV manufactured by Idemitsu Kosan Co., Ltd., MFR=30
PP-4: J-6083HP manufactured by Idemitsu Kosan Co., Ltd., MFR=60

M-MB: prepared by melt kneading PP-3 (80 parts by mass) and the modified polypropyleneMPPP-1 described in Table 6 (120 parts by mass) at 200° C. using a twin-screw extruder provided with a vent The results shown in Table 8 show that the molded article prepared from the fiber-reinforced polyolefin-based resin pellets containing the surface-treated glass fibers produced using the surface treated resin of the invention had a fatigue strength under oscillation (80 MPa, 10 Hz) of 5000 times or more.

The fatigue strength under oscillation at 80 MPa of 5,000 times corresponds to $10^7$ times (10,000,000 times) at 35 MPa. The fatigue strength under oscillation of $10^7$ times is equivalent to the service life of a vehicle. It is understood that the molded article of the invention can withstand oscillation fatigue at 35 MPa until the service life of a vehicle.

INDUSTRIAL APPLICABILITY

The molded article produced using the glass fiber-reinforced polypropylene-based resin composition of the invention has a drastically improved fatigue strength under oscillation, and can retain a high degree of reliability for a long period of time.

The glass fiber-reinforced polypropylene-based resin composition of the invention is useful in manufacturing automobile parts (e.g. front ends, fan shrouds, cooling fans, engine under-covers, engine covers, radiator boxes, side doors, back doors (inner), back doors (outer), outer panels, roof rails, door handles, luggage boxes, wheel covers, handles, cooling modules, air cleaner components, air cleaner cases, pedals); parts for bicycles or motorcycles (e.g. luggage boxes, handles, wheels); household appliances (e.g. hot water washing toilet sheets, bathroom supplies, chair legs, valves, meter boxes); others including laundry parts or laundry/dryer parts (e.g. balancing rings, waste water receiver covers, waste water receivers, and drain port guides), electric tools, handles of lawn mowers, hose joints, resin bolts, and concrete frames. In particular, the glass fiber-reinforced polypropylene-based resin composition of the invention is best suited to manufacture automobile parts including luggage boxes, side doors, air cleaner cases, backdoors (inner), front end modules (including fan shrouds, fan, and cooling modules), meter boxes, switch boards, and engine covers.

The invention claimed is:

1. A molded article, comprising a surface-treated glass fiber that comprises
   a surface to which a sizing agent comprising a maleic acid-modified polypropylene-based resin and a silane coupling agent adhere,
   wherein the acid-modified polyolefin resin comprises (1) an amount of components extractable with boiling methyl ethyl ketone of 8 mass % or less; (2) a number average molecular weight (Mn), measured by gel permeation chromatography (GPC), of 6,000 to 48,000; and (3) an amount of an acid which has been added, measured by Fourier transform infrared spectroscopy, of 0.1 to 12 mass %
   the fiber diameter of the glass fiber being 3 to 30 μm,
   wherein the molded article has a fatigue strength under oscillation at 80 MPa and 10 Hz of at least 5000 times.

2. The molded article of claim 1, wherein the amount of components extractable with boiling methyl ethyl ketone is 1.2 mass % or less.

3. The molded article of claim 1, wherein the amount of low molecular weight carboxylic acid group-containing components is 0.3 mass % or less.

4. The molded article of claim 1, wherein the sizing agent adhering to the glass fibers is present in an amount of 0.03 to 2.0 mass % for 100 mass % of the glass fibers.

5. The molded article of claim 4, wherein a ratio of the maleic acid-modified polypropylene/the silane coupling agent is 1 to 20.

6. The molded article of claim 1, wherein the amount of components extractable with boiling methyl ethyl ketone is 6 mass % or less.

7. The molded article of claim 1, wherein the amount of components extractable with boiling methyl ethyl ketone is 5.5 mass % or less.

8. A molded article, comprising a fiber-reinforced polyolefin-based resin comprising a surface-treated glass fiber that comprises
   a surface to which a sizing agent comprising a maleic acid-modified polypropylene-based resin and a silane coupling agent adhere,
   wherein the acid-modified polyolefin resin comprises (1) an amount of components extractable with boiling methyl ethyl ketone of 8 mass % or less; (2) a number average molecular weight (Mn), measured by gel permeation chromatography (GPC), of 6,000 to 48,000; and (3) an amount of an acid which has been added, measured by Fourier transform infrared spectroscopy, of 0.1 to 12 mass %,
   the fiber diameter of the glass fiber being 3 to 30 μm
   wherein an aspect ratio of the glass fiber (average fiber length/average fiber diameter) being 50 to 6000, and
   wherein the molded article has a fatigue strength under oscillation at 80 MPa and 10 Hz of at least 5000 times.

9. The molded article of claim 8, wherein the fiber-reinforced polyolefin-based resin is a polypropylene-based resin.

10. The molded article of claim 8, comprising a fiber having an average residual fiber length of 0.4 mm or more.

11. A molded article comprising a long fiber-reinforced polyolefin-based resin pellet that comprises a surface-treated glass fiber and a polypropylene-based resin comprising a maleic acid-modified polypropylene-based resin, wherein the pellet has a length of 2 to 200 mm, wherein
    the surface-treated glass fiber comprises
    a surface to which a sizing agent comprising a maleic acid-modified polypropylene-based resin and a silane coupling agent adhere,
    wherein the acid-modified polyolefin resin comprises (1) an amount of components extractable with boiling methyl ethyl ketone of 8 mass % or less; (2) a number average molecular weight (Mn), measured by gel permeation chromatography (GPC), of 6,000 to 48,000; and (3) an amount of an acid which has been added, measured by Fourier transform infrared spectroscopy, of 0.1 to 12 mass %,
    the fiber diameter of the glass fiber being 3 to 30 μm
    wherein an aspect ratio of the glass fiber (average fiber length/average fiber diameter) being 50 to 6000, and
    wherein the molded article has a fatigue strength under oscillation at 80 MPa and 10 Hz of at least 5000 times.

12. The molded article of claim 11, wherein the ratio of the surface-treated glass fiber to the polypropylene-based resin + the maleic acid-modified polypropylene-based resin is 10 to 70:90 to 30, and
    wherein the ratio of the polypropylene-based resin to the maleic acid-modified polypropylene-based resin is 80 to 99:20 to 1.

* * * * *